US00RE46302E

(19) United States
(12) Reissued Patent
Seo et al.

(10) Patent Number: US RE46,302 E
(45) Date of Reissued Patent: Feb. 7, 2017

(54) APPARATUS AND METHOD FOR INTERFACING BETWEEN A/V SYSTEM AND PORTABLE DEVICE

(71) Applicant: Samsung Electronics Co., Ltd., Suwon-si, Gyeonggi-do (KR)

(72) Inventors: Min-Cheol Seo, Suwon-si (KR); Tai-ryong Kang, Suwon-si (KR); Kyung-soon Song, Seoul (KR); You-jin Nam, Pyeongtaek-si (KR)

(73) Assignee: Samsung Electronics Co., Ltd., Suwon-si (KR)

(21) Appl. No.: 13/846,566

(22) Filed: Mar. 18, 2013

Related U.S. Patent Documents

Reissue of:
(64) Patent No.: 8,090,884
Issued: Jan. 3, 2012
Appl. No.: 11/585,988
Filed: Oct. 25, 2006

(30) Foreign Application Priority Data

Nov. 25, 2005 (KR) ..... 10-2005-0113491
Nov. 25, 2005 (KR) ..... 10-2005-0113492
Jun. 1, 2006 (KR) ..... 10-2006-0049566

(51) Int. Cl.
*G11B 20/10* (2006.01)
*G11B 20/00* (2006.01)

(52) U.S. Cl.
CPC ..... *G11B 20/10* (2013.01); *G11B 20/0021* (2013.01)

(58) Field of Classification Search
CPC ..... G11B 20/10; G11B 20/0021
USPC ..... 710/62
See application file for complete search history.

(56) References Cited

U.S. PATENT DOCUMENTS 6,370,603 B1 * 4/2002 Silverman ..... G06F 13/385 709/220
2003/0088325 A1 * 5/2003 Crutchfield ..... 700/94
2003/0153993 A1 8/2003 Okamoto
2003/0215102 A1 11/2003 Marlowe
2005/0026559 A1 * 2/2005 Khedouri ..... 455/3.06
(Continued)

FOREIGN PATENT DOCUMENTS

JP 2005-252669 9/2005
KR 20-0336595 A 9/2003
(Continued)

OTHER PUBLICATIONS

European Office Action for European counterpart application of the parent application (European Application No. 06 124 330.9—1245) dated Jul. 18, 2011.
(Continued)

*Primary Examiner* — Idriss N Alrobaye
*Assistant Examiner* — Brooke Taylor
(74) *Attorney, Agent, or Firm* — Jefferson IP Law, LLP

(57) ABSTRACT

An interface apparatus and method for transmission and reception of a control signal and a digital stream between an audio/video (A/V) system and a digital data recording and/or reproducing device are provided. The device for recording and/or reproducing digital data includes: a storage unit storing digital data encoded in a predetermined format; a decoder unit decoding digital data stored in the storage unit; an interface unit transmitting the decoded data to an external device; and a control unit controlling the storage unit, the decoder unit, and the interface unit.

39 Claims, 29 Drawing Sheets

(56) References Cited

U.S. PATENT DOCUMENTS

| | | | | |
|---|---|---|---|---|
| 2005/0080954 | A1* | 4/2005 | Castro et al. | 710/52 |
| 2005/0117885 | A1* | 6/2005 | Lee et al. | 386/95 |
| 2005/0149635 | A1* | 7/2005 | Otsuka et al. | 710/1 |
| 2005/0165997 | A1* | 7/2005 | Sakaki et al. | 710/313 |
| 2005/0182883 | A1* | 8/2005 | Overtoom | 710/305 |
| 2005/0210195 | A1* | 9/2005 | Teicher et al. | 711/115 |
| 2006/0004788 | A1* | 1/2006 | Pilgrim et al. | 707/100 |
| 2006/0065743 | A1* | 3/2006 | Fruhauf | 235/492 |
| 2006/0085577 | A1* | 4/2006 | Takashima | G11B 19/02 710/62 |
| 2006/0134959 | A1* | 6/2006 | Ellenbogen | 439/297 |

FOREIGN PATENT DOCUMENTS

| | | | |
|---|---|---|---|
| KR | 1020040025717 | | 3/2004 |
| KR | 1020040025717 | A | 3/2004 |
| KR | 10-2004-0066970 | A | 7/2004 |
| KR | 10-2005-0038082 | A | 4/2005 |
| KR | 1020050062432 | | 6/2005 |
| KR | 1020050062432 | A | 6/2005 |
| KR | 2005-252669 | | 9/2005 |
| KR | 10-2005-0099443 | A | 10/2005 |
| KR | 10-2005-0119318 | A | 12/2005 |
| KR | 1020050122399 | | 12/2005 |
| KR | 1020050122399 | A | 12/2005 |
| WO | 2005/090126 | A1 | 9/2005 |
| WO | WO2005/090126 | | 9/2005 |

OTHER PUBLICATIONS

Office Action dated Oct. 12, 2012 issued by the Korean Intellectual Property Office in counterpart Korean Application No. 10-2006-0049566.

Office Action dated Jul. 29, 2013 issued by the European Patent Office in counterpart European Application No. 06124330.9.

Search Report dated Jul. 11, 2013 issued by the European Patent Office in counterpart European Application No. 13168270.0.

Notice of Allowance dated Oct. 22, 2013 issued by the Korean Intellectual Property Office in counterpart Korean Application No. 10-2006-0049566.

Search Report dated Nov. 27, 2013 issued by the European Patent Office in counterpart European Application No. 06 124 330.9.

Examination Report dated Apr. 1, 2014 issued by the European Patent Office in European Application No. 13 168 270.0.

"Setting up SoundManager Support". Feb. 1, 2001, XP055157048, Retrieved from the Internet: URL:http://tascam.com/content/content/downloads/products/314/soundmanager.pdf [retrieved on Dec. 5, 2014].

European Office Action issued in European Application No. EP13168270 dated Dec. 12, 2014.

Universal Serial Bus Specification Revision 2.0, Chapter 4, architectural overview, Apr. 27, 2000, pp. 15-24, XP002333867.

* cited by examiner

2002

| | |
|---|---|
| 1 | REQH |
| 2 | GND |
| 3 | BU+14 |
| 4 | CH CON |
| 5 | CH MUTE |
| 6 | A GND |
| 7 | CH RST |
| 8 | R ch |
| 9 | REQH |
| 10 | DATAC |
| 11 | DATAH |
| 12 | L ch |
| 13 | CH CLK |

2004

| | |
|---|---|
| 1 | C-BUS DATA |
| 2 | C-BUS CLOCK |
| 3 | |
| 4 | C-BUS SERVICE REQUEST |
| 5 | |
| 6 | Signal GND |
| 7 | CD L-ch input |
| 8 | CD R-ch input |
| 9 | |
| 10 | BACK UP |
| 11 | REMOTE CONTROL |
| 12 | GND |
| 13 | |

APPARATUS AND METHOD FOR INTERFACING BETWEEN A/V SYSTEM AND PORTABLE DEVICE

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS-REFERENCE TO RELATED PATENT APPLICATIONS

This application claims the benefit under 35 U.S.C. §119 (a) of Korean Patent Application No. 10-2005-0113491, filed on Nov. 25, 2005, Korean Patent Application No. 10-2005-0113492, filed on Nov. 25, 2005 and Korean Patent Application No. 10-2006-0049566, filed on Jun. 1, 2006, in the Korean Intellectual Property Office, the entire disclosures of which are hereby incorporated by reference.

BACKGROUND OF THE INVENTION

1. Field of the Invention

The present invention relates to an apparatus and method for interfacing between an audio/visual (A/V) system and a portable device. More particularly, the present invention relates to an apparatus and method for interfacing between and A/V system and a digital data recording and/or reproducing apparatus for transmission and reception of a control signal and a digital stream therebetween.

2. Description of the Related Art

The use of portable multimedia devices, such as MP3 players, has recently begun to increase. Accordingly, there is a need for a technology that is capable of reproducing a multimedia file which is stored in a portable device, on an A/V device, such as a personal computer (PC) and a car audio system, or a technology for controlling the portable device. A user may experience greater benefits if an audio signal of a portable device is listened through an amplifier (AUX) of a non-portable device or with a digital sound field (DSP) effect, or if a file stored on an MP3 player is reproduced and the operation is controlled through a car audio while the user drives a car. So far, there has been no technology capable of controlling the operation of a portable multimedia file recording and/or reproducing apparatus in an A/V system and a linking stream.

FIG. 1 is a block diagram illustrating an example in which conventional multimedia recording and/or reproducing devices 114 through 118 operating as universal serial bus (USB) portable devices are connected to an A/V system 100.

Referring to FIG. 1, the conventional A/V system 100 comprises a key input unit 101, a control unit 102, an MPEG codec 104, a DVD module 106, a video output unit 108, an audio output unit 110, and a USB connection unit 112. If multimedia recording and/or reproducing devices, such as a hard disk drive (HDD) 114, a digital camera 116, and a wireless terminal 118, are connected to the USB connection unit 112, these devices are recognized as portable storage devices, and the control unit 102 generates a list of files that can be reproduced, and outputs the list through the output unit 108 so that a user can recognize multimedia files that can be output.

If the user desires to have a specific file reproduced, the file is read from the device 114, 116 or 118, the file is decoded in the MPEG codec 104, and then, the decoded signal is transmitted to the video output unit 108 and the audio output unit 110.

Recently, a variety of multimedia content files have become available for purchase as content files. Many content files are sold and protected by digital rights management (DRM). Reproduction of the content to which the DRM technology is applied is limited so that only one device can reproduce the content. According to the conventional technology, a file bought to be reproduced in the devices 114 through 118 cannot be reproduced in the A/V system 100 even though the devices 114 through 118 are connected to the A/V system 100 through the USB connection unit 112.

The A/V system 100 should have a codec capable of decoding the formats to successfully support content files with a variety of formats. That is, in the case of a content file in a format that can be reproduced in the external devices 114 through 118 but cannot be supported by the MPEG codec unit 104, the content file cannot be reproduced in the A/V system 100.

FIG. 2 is a block diagram illustrating data of a portable device 220 being reproduced in a non-portable device 210 according to a conventional technology.

Referring to FIG. 2, in order to listen to an audio signal of the portable device 220 through an amplifier or the DSP effect of the non-portable device 210, the analog output of the portable device 220 is connected to an amplifier (AUX) of the non-portable device 210. This configuration is inconvenient because the non-portable device 210 and the portable device 220 should be operated separately. Also, since only an analog audio signal can be transmitted from the portable device 220, the quality of sound is degraded.

FIG. 3 is a block diagram illustrating a portable device 220 that is controlled from a non-portable device 210 according to a conventional technology.

Referring to FIG. 3, in order to control the portable device 220, an operation command transmitted by the non-portable device 210 is converted in a separate control box 300 and transferred to the portable device 220. An RS232C connection between each module is used. However, this configuration has a drawback in that it requires a separate device.

FIG. 4 is a block diagram illustrating data of a portable device 410 being reproduced in a car audio/visual (A/V) system 420 according to a conventional technology.

This is a method extending the use of the conventional car A/V system, by reproducing a multimedia file stored in the portable device 410 in a car A/V system 420. This allows a user to experience greater benefits if multimedia data with a variety of formats is listened through an amplifier (AUX) or with a DSP effect of the car A/V system 420 that is a non-portable device, or if a file stored in an MP3 player is reproduced and the operation is controlled through the car A/V system while the user drives the car.

Referring to FIG. 4, an analog output of the portable device 410 is connected to an amplifier (AUX) of the car A/V system 420. This configuration is inconvenient because the car A/V system 420 and the portable device 410 should be operated separately. That is, when a file stored on an MP3 player is listened through a car audio system, volume is controlled through the car audio system, and song selection is inconveniently performed in the MP3 player. Furthermore, due to battery life restrictions of the portable device, it is impossible to use for an unrestricted period time.

Accordingly, there is a need for an improved system and method for interfacing between an audio/visual (A/V) system and a digital data recording and/or reproducing apparatus for transmission and reception of a control signal and a digital stream.

SUMMARY OF THE INVENTION

An aspect of exemplary embodiments of the present invention is to address at least the above problems and/or disadvantages and to provide at least the advantages described below. Accordingly, an aspect of exemplary embodiments of the present invention is to provide an apparatus and method for controlling an operation of a digital data recording and/or reproducing apparatus only by manipulation of an audio/visual (A/V) system without a need for additional equipment, and capable of reproducing a multimedia content file stored in the digital data recording and/or reproducing apparatus in the A/V system.

An exemplary embodiment of the present invention also provides an apparatus and method for controlling a portable digital data recording and/or reproducing apparatus by using an unaltered conventional A/V system. According to an exemplary embodiment of the present invention, an apparatus and method facilitates the storage of data in the portable apparatus to be reproduced through an amplifier of the A/V system.

An exemplary embodiment of the present invention also provides an apparatus and method for reproducing a file of a digital data recording and/or reproducing apparatus in an A/V system irrespective of whether the A/V system supports a codec.

According to an exemplary embodiment of the present invention, an apparatus and method are provided to reproduce a file of a digital data recording and/or reproducing apparatus protected by a digital rights management (DRM) technology in an A/V system.

According to an aspect of an exemplary embodiment of the present invention, a digital data recording and/or reproducing apparatus for recording and/or reproducing digital data is provided. The apparatus comprises a storage unit, a decoder unit, an interface unit and a control unit. The storage unit stores digital data encoded in a predetermined format. The decoder unit decodes digital data stored in the storage unit. The interface unit transmits the decoded data to an external device and the control unit controls the storage unit, the decoder unit, and the interface unit.

The interface unit may include a universal serial bus (USB) device controller.

The control unit may control the decoder unit to decode the digital data in predetermined units according to a control signal from the external device, and the USB device controller may include a first bulk interface that sequentially transmits the data decoded in predetermined units.

The USB device controller may further include a second bulk interface to transmit/receive the control signal and control information including information on the digital data to/from the external device. Also, through the first bulk interface, the USB device controller may receive a control signal from the external device and transmit information on digital data requested by the external device.

The USB device controller may include an isochronous interface for transmission of the decoded data in response to a control signal from the external device. According to an exemplary implementation, the USB device controller may further include a bulk interface that transmits/receives the control signal and control information including the result of executing the control signal to/from the external device.

Also, USB device controller may receive a digital stream from the external device through the isochronous interface, and the control unit may encode the received digital stream and store the encoded digital stream in the storage unit.

If the digital data is encrypted data, the control unit may decrypt the encrypted data and then transmit the decrypted data to the external device. The control unit may transmit the decoded data to the external device by using an encryption method.

The apparatus may further include an input unit that receives an input of a device using method. If a command to use a conventional USB protocol is input through the input unit, the control unit may control the USB device controller so that the digital data recording and/or reproducing apparatus operates according to the conventional USB protocol.

The apparatus may further include a digital/analog (D/A) conversion unit to convert the decoded data into analog data. According to an exemplary implementation, the control unit may control transmission of data so that the decoded data is selectively transmitted to the D/A conversion unit or to the interface unit.

According to another aspect of an exemplary embodiment of the present invention, an audio/video (A/V) system is provided. The AV system comprises an interface unit, a D/A conversion unit and a control unit. The interface unit receives decoded data from an external device, the D/A conversion unit converts the received decoded data into analog data and the control unit controls the interface unit and the D/A conversion unit.

The interface unit may include a USB host controller.

When a multimedia file to be reproduced is to be received from an external device the control unit may determine a time interval required to receive a unit of decoded data from the external device and the number of units of decoded data that are required to be received by referring to information on the multimedia file. According to the determined time interval, the control unit may sequentially transmit a control signal requesting data, through the USB host controller, a number of times according to the number of units determined, and the USB host controller may include a first bulk interface to sequentially receive data in predetermined reception units.

According to an exemplary implementation, the USB host controller may further include a second bulk interface transmitting/receiving the control signal and control information on the multimedia file to/from the external device.

The USB host controller may also transmit/receive the control signal and control information on the multimedia file to/from the external device through the first bulk interface.

The USB host controller may include an isochronous interface receiving the decoded data. According to an exemplary implementation, the USB host controller may further include a bulk interface transmitting/receiving the control signal and control information including the result of executing the control signal to/from the external device. Also, through the isochronous interface, the USB host controller may transmit a digital stream to be stored in the external device.

According to another aspect of an exemplary embodiment of the present invention, a method of reproducing a multimedia file stored in a multimedia file recording and/or reproducing apparatus through an external device is provided. A control signal is received from the external device, a requested multimedia file is decoded if the control signal is a reproduction command and the decoded data is transmitted to the external device.

According to another aspect of an exemplary embodiment of the present invention, a method of reproducing a multimedia file stored on an external device through an A/V system is provided. A control signal to the external device is transmitted to command the multimedia file to be reproduced. Decoded data is received from the external device in response to the control signal and the decoded data is converted into analog data and the analog data is output.

According to another aspect of an exemplary embodiment of the present invention, an interface apparatus between an A/V system and a portable device is provided. The apparatus comprises a first connection unit, a second connection unit and an interface processing unit. The first connection unit connects the portable device and the second connection unit connects the A/V system. The interface processing unit converts a data format of the first connection unit into a data format of the second connection unit or converts a data format of the second connection unit into a data format of the first connection unit.

The first connection unit may be a USB connection unit.

The second connection unit may be a first serial connection unit.

The interface processing unit may include a USB host controller, a serial controller, a microcontroller and a D/A conversion unit. The USB host controller controls data communication with the portable device through the USB connection unit. The serial controller controls data communication with the A/V system through the first serial connection unit and the microcontroller converts a control signal input from the serial controller into a USB command and outputs the USB command to the USB host controller. The microcontroller also converts reproduction information input from the USB host controller into data that complies with a protocol for connection to the A/V system, and outputs the converted data to the serial controller. The D/A conversion unit converts a digital data stream input through the USB host controller into analog data and outputs the analog data to the serial controller.

The apparatus may further include a conversion unit connected to a front end of the first serial connection unit and that converts a pin input of the A/V system to fit the pin arrangement of the first serial connection unit.

The apparatus may further include a bypass unit and an input unit. The bypass unit is directly connected to the first serial connection unit and a second serial connection unit. The input unit receives information on a device to be used, wherein if the device to be used that is input through the input unit is a CD changer, the microcontroller controls the bypass unit to facilitate data communication between the A/V system and the CD changer.

The USB host controller may comprise a bulk interface and an isochronous interface. The bulk interface transmits and receives the USB command and the reproduction information. The isochronous interface or a bulk interface receives the digital stream.

According to another aspect of an exemplary embodiment of the present invention, an interface method between an A/V system and a portable device is provided. A signal format of the A/V system is converted into a signal format of the portable device and the converted signal is then output. A signal format of the portable device is converted into a signal format of the A/V system and the converted signal is output.

According to another aspect of the present invention, an interface method between an A/V system and a portable device is provided. A control signal is received from the A/V system through a second connection unit. The control signal is then converted into a data format of a first connection unit and the converted signal is transmitted to the portable device through the first connection unit. A digital stream is received from the portable device through the first connection unit in response to the control signal. The received digital stream is converted into an analog signal and the analog signal is transmitted to the A/V system through the second connection unit.

Other objects, advantages and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other objects, features and advantages of certain exemplary embodiments of the present invention will be more apparent from the following description taken in conjunction with the accompanying drawings, in which.

Throughout the drawings, the same drawing reference numerals will be understood to refer to the same elements, features and structures.

DETAILED DESCRIPTION OF EXEMPLARY EMBODIMENTS

The matters defined in the description such as a detailed construction and elements are provided to assist in a comprehensive understanding of the embodiments of the, invention. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

Figure 1:
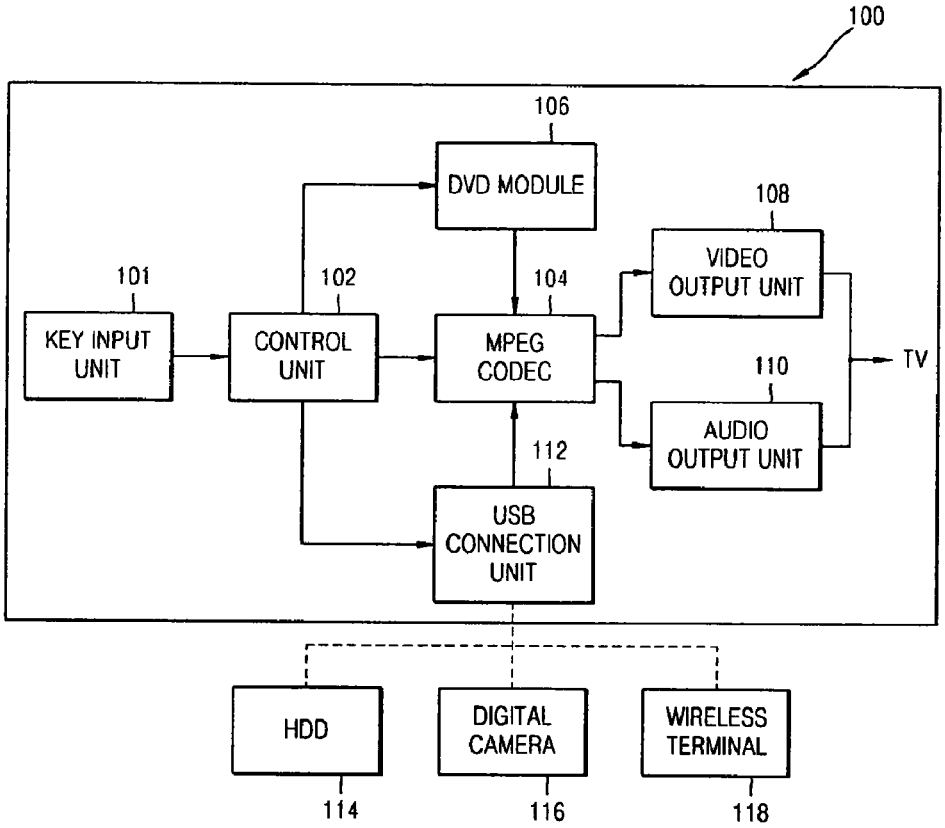
FIG. 1 is a block diagram illustrating an example in which a conventional multimedia recording and/or reproducing device operating as a USB portable device is connected to an A/V system.
Figure 2:
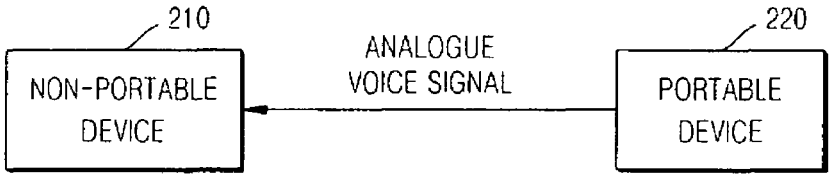
FIG. 2 is a block diagram illustrating data of a portable device being reproduced in a non-portable device according to a conventional technology.
Figure 3:
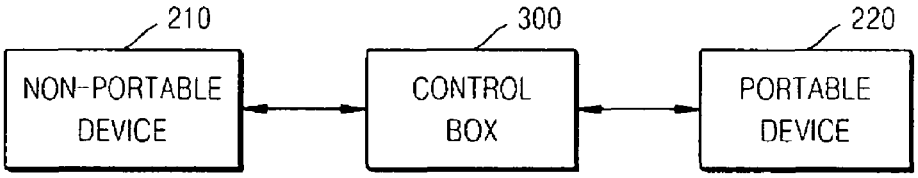
FIG. 3 is a block diagram illustrating a portable device being controlled from a non-portable device according to a conventional technology.
Figure 4:
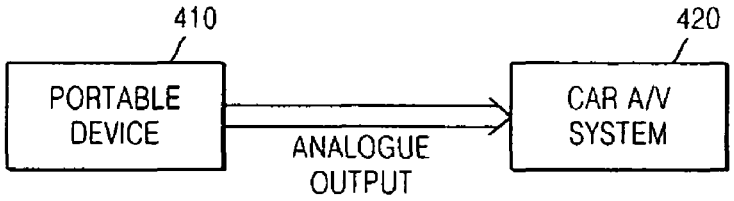
FIG. 4 is a block diagram illustrating data of a portable device being reproduced in a car audio/visual (A/V) system according to a conventional technology.
Figure 5:
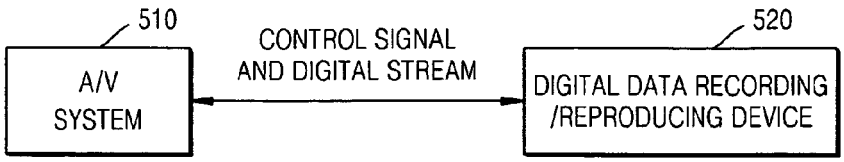
FIG. 5 is a block diagram illustrating an example of controlling a digital data recording and/or reproducing apparatus in an A/V system according to an exemplary embodiment of the present invention.

FIG. 5 is a block diagram illustrating an example of controlling a digital data recording and/or reproducing apparatus 520 in an A/V system 510 according to an exemplary embodiment of the present invention.

Referring to FIG. 5, transmission and reception of a control signal and a digital stream can be performed between the non-portable A/V system 510 and the portable digital data recording and/or reproducing apparatus 520 without adding a separate device.

Figure 6:
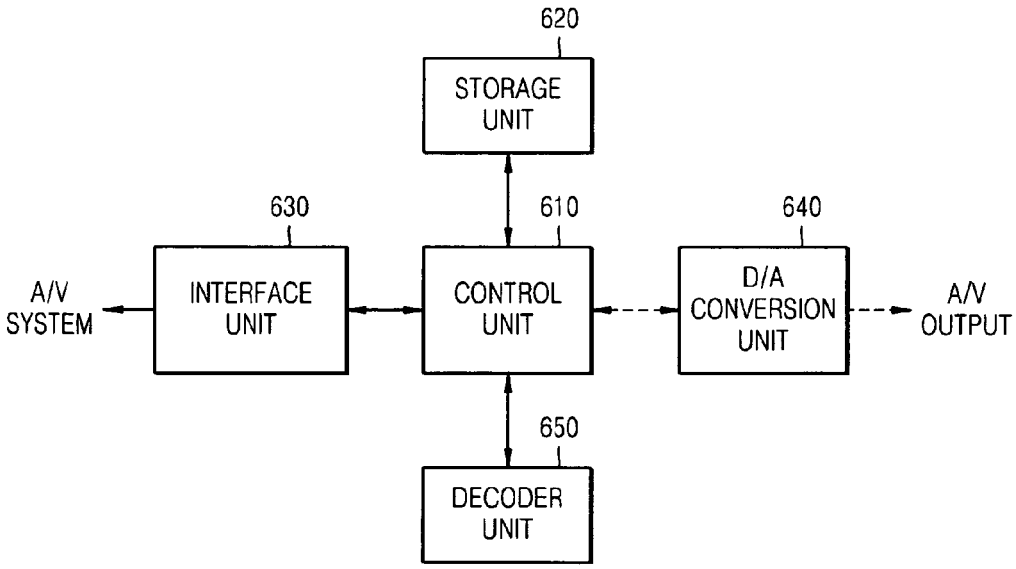
FIG. 6 is a block diagram illustrating a digital data recording and/or reproducing apparatus according to an exemplary embodiment of the present invention.

FIG. 6 is a block diagram illustrating a digital data recording and/or reproducing apparatus according to an exemplary embodiment of the present invention.

Referring to FIG. 6, the digital data recording and/or reproducing apparatus, according to an exemplary embodiment of the present invention, comprises a storage unit 620, a decoder unit 650, an interface unit 630 and a control unit 610. The storage unit 620 stores digital data encoded in a predetermined format and the decoder unit 650 decodes the digital data stored in the storage unit 620. The interface unit 630 transmits the decoded data to an A/V system that is an external device, and transmits control information to and receives control information from the A/V system. The control unit 610 controls other modules. According to an exemplary implementation, a D/A conversion unit 640 that converts the decoded data and outputs the converted data may also be included. The apparatus reproduces digital data through the A/V system or through the D/A conversion unit 640 disposed in the apparatus according to a user's selection or according to a preset setting. Thus, the transmission direction of data is changed according to internal switching based on software. The interface unit 630 for communication with the A/V system is not limited to an interface supporting a predetermined protocol.

If digital data is in the form of an encrypted file to which a DRM technology or the like is applied, the control unit 610 decrypts the file and then decodes the decrypted file through the decoder unit 650. The control unit 610 may use an encryption method when transmitting the decoded file if the protection of the file must be maintained when the file is reproduced and then transmitted. At this time, the A/V system decrypts the received file and outputs the file.

Figure 7:
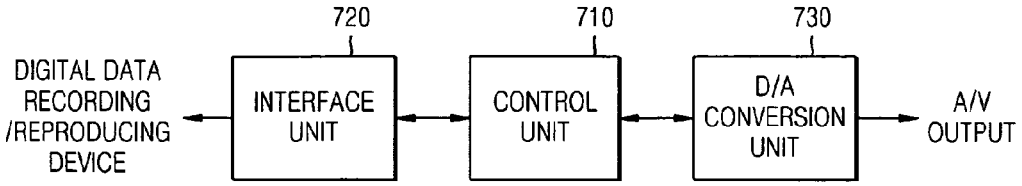
FIG. 7 is a block diagram illustrating an A/V system according to an exemplary embodiment of the present invention.

FIG. 7 is a block diagram illustrating an A/V system according to an exemplary embodiment of the present invention.

According to an exemplary embodiment of the present invention, the A/V system of FIG. 7 comprises an interface unit 720, a D/A conversion unit 730 and a control unit 710. The interface unit 720 receives a digital stream and receives/transmits control information from/to an external digital data recording and/or reproducing apparatus. The D/A conversion unit 730 converts the received decoded data into analog data and outputs the analog data. The control unit 710 controls the interface unit 720 and the D/A conversion unit 730. The interface unit 720 communicates with the digital data recording and/or reproducing apparatus and is not limited to an interface for a predetermined protocol.

Figure 8:
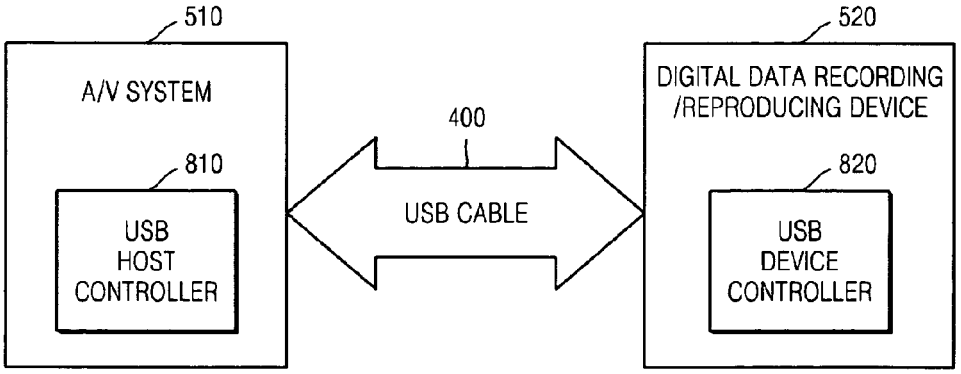
FIG. 8 is a block diagram illustrating a universal serial bus (USB) interface being used to control a digital data recording and/or reproducing apparatus in an A/V system according to an exemplary embodiment of the present invention.

FIG. 8 is a block diagram illustrating a universal serial bus (USB) interface used to control a digital data recording and/or reproducing device 520 in an A/V system 510 according to an exemplary embodiment of the present invention.

Referring to FIG. 8, the A/V system 510 and the digital data recording and/or reproducing device 520 are connected through a USB cable 400. The A/V system 510 has an embedded USB host controller 810 that supports a USB control interface according to an exemplary embodiment of the present invention. The digital data recording and/or reproducing device 520 has an embedded USB device controller 820 that supports a USB control interface according to an exemplary embodiment of the present invention.

Figure 9:
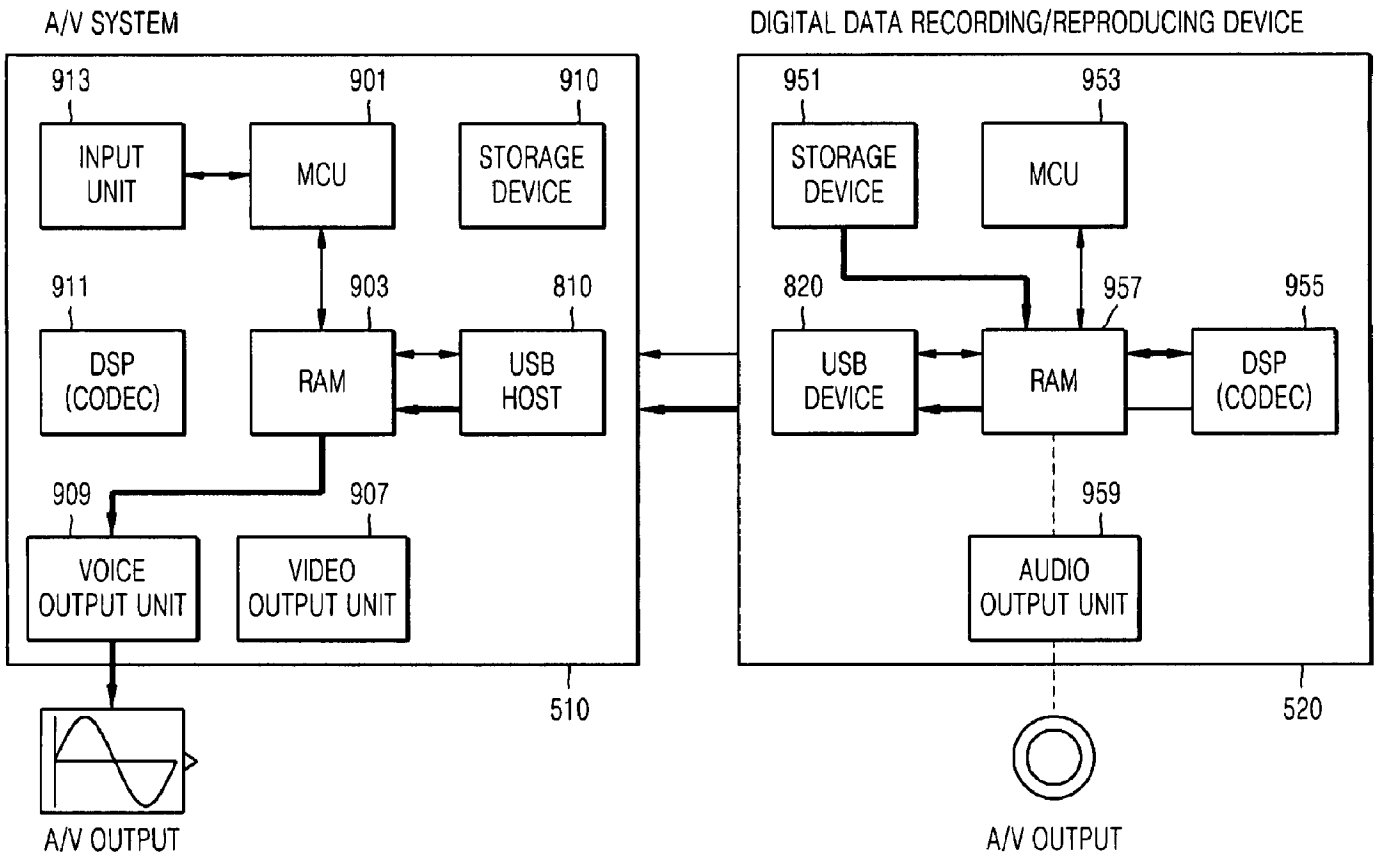
FIG. 9 is a block diagram illustrating detailed internal structures of the A/V system and the digital data recording and/or reproducing apparatus of FIG. 8 and data flow therein according to an exemplary embodiment of the present invention.

FIG. 9 is a block diagram illustrating detailed internal structures of the A/V system 510 and the digital data recording and/or reproducing apparatus 520 of FIG. 8 and data flow therein according to an exemplary embodiment of the present invention. FIG. 8 also illustrates an example of the digital data recording and/or reproducing apparatus 520 that is used as an apparatus for recording and reproducing an audio file according to an exemplary embodiment of the present invention. In FIG. 9, the data flow is indicated by thick arrows which illustrate a path of a digital stream. The data flow indicated by thin arrows illustrates a path of control information.

Referring to FIG. 9, the digital data recording and/or reproducing; apparatus 520 receives a control signal, such as a reproduction command, from the A/V system 510 through the USB device controller 820. A microcontroller 953 (hereinafter referred to as an 'MCU') that is in charge of controlling the apparatus 520 reads digital data of which reproduction is requested, from a storage unit 951. The microcontroller 953 decodes the read file through a digital signal processor 955 (DSP, hereinafter referred to as a 'codec') that corresponds to a reproduction unit. The decoded data is loaded in a memory 957 (hereinafter referred to as a 'RAM'), and is transmitted to the A/V system 510 through the USB device controller 820. If the file is reproduced in the digital data recording and/or reproducing apparatus 520, the file is converted into an analog signal and output through an audio output unit 959.

Referring to FIG. 9, the A/V system 510 receives streaming data through the USB host controller 810 and loads the data in a RAM 903. An MCU 901 controls the A/V system 510 so that the received data is converted into an analog signal and output through a voice output unit 909. The A/V system 510 may be a car A/V system or a home A/V system, and may further include a storage device 901 and a codec 911. Also, the A/V system may further include an input unit 913 to receive input from a user. The user can select a multimedia file to be reproduced and send a reproduction command through the input unit 913. The A/V system 510 may also include a video output unit 907 to output a reproduction list or a reproduction state.

Figure 10:
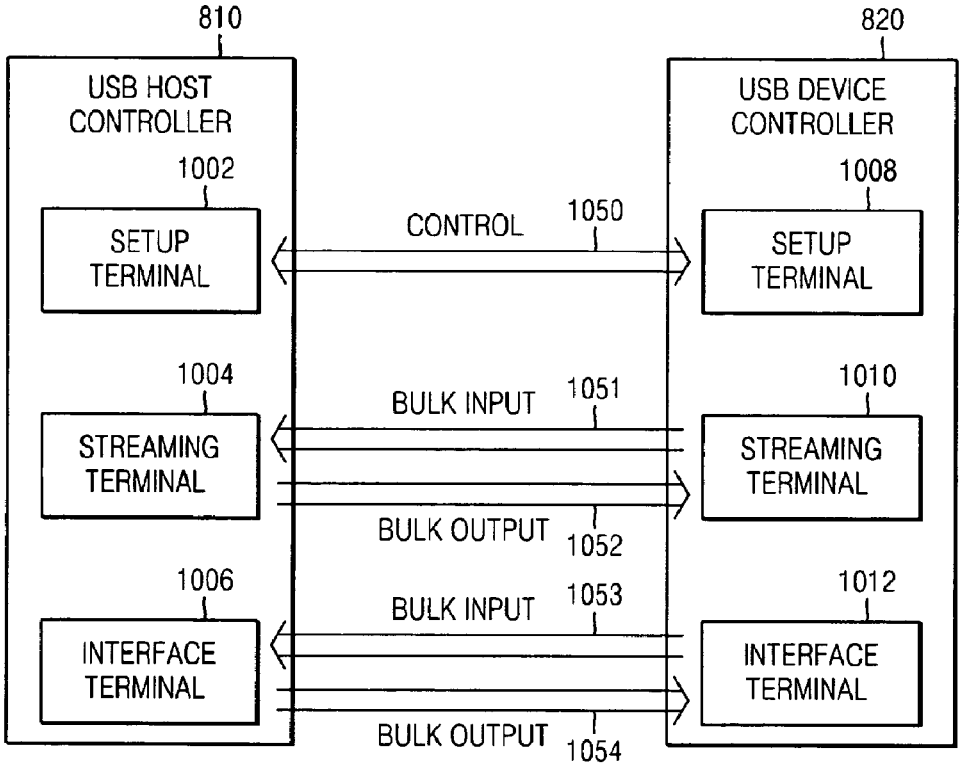
FIG. 10 is a block diagram illustrating an interface structure between a USB host and a USB device according to an exemplary embodiment of the present invention.

FIG. 10 is a block diagram illustrating an interface structure between a USB host controller 810 and a USB device controller 820 of FIGS. 8 and 9 according to an exemplary embodiment of the present invention. FIG. 10 illustrates a logical connection structure between the USB host controller 810 and the USB device controller 820. If a USB connection is established, the USB host 810 and the USB device 820 that are physical objects are connected to each other through 5 logical data pipes, as illustrated in FIG. 10. According to the exemplary embodiment of the present invention, these data pipes are connected between setup terminals 1002 and 1008, streaming terminals 1004 and 1010, and interface terminals 1006 and 1012. According to a USB standard, a data pipe between a USB host, such as the USB host controller 810, and a USB device, such as the USB device controller 820 for data transmission and reception, is referred to as an endpoint. According to an exemplary embodiment of the present invention, a control interface includes a control endpoint 1050, a first bulk interface includes a bulk input endpoint 1051 and/or a bulk output endpoint 1052,and a second bulk interface includes a bulk input endpoint 1053 and/or a bulk output endpoint 1054.

The control endpoint 1050 of FIG. 10 connects the setup terminals 1002 and 1008. The control endpoint 1050 is also a data pipe for transmitting and receiving information required to set the streaming terminals 1004 and 1010 and the interface terminals 1006 and 1012. If a USB cable is connected, the USB host 810 requests a standard descriptor of the USB device 820 through the control endpoint 1050. Then, the USB host 810 receives the descriptor on a configuration of endpoints as a response, from the USB device 820, and forms the remaining endpoints. In the exemplary embodiment of the present invention illustrated in FIG. 10, the endpoints set through the control endpoint 1050 are the bulk input endpoint 1051 and the bulk output endpoint 1052 of the streamlining terminals 1004 and 1010, and the bulk input endpoint 1053 and the bulk output endpoint 1054 of the interface terminals 1006 and 1012. According to an exemplary implementation, the directions of input and output are described as seen from the USB host 810.

The bulk input endpoint 1051 of the streaming terminals 1004 and 1010 is a data pipe for transmitting streaming data from the USB device 820 to the USB host 810, and for transferring an audio and/or video signal decoded in the digital data recording and/or reproducing apparatus 520. The bulk output endpoint 1052 is also used to transmit a synchronization signal. If the bulk output endpoint 1052 is used as an interface for downstreaming to the digital data recording and/or reproducing apparatus 520, it is also possible to implement a function to store multimedia data decoded in the A/V system 510 in the digital data recording and/or reproducing apparatus 520. For example, it is possible to transmit an output signal of a car audio system to an MP3 player to record the signal. In this case, the digital data recording and/or reproducing apparatus 520 encodes and stores the data transmitted through the bulk output endpoint 1052.

The interface terminals 1006 and 1012 are for transmission and reception of a control signal between the USB host 810 and the USB device 820. A control signal, such as a reproduction command, is transmitted through the bulk output endpoint 1054 to the USB device 820, and control information, such as information on a multimedia file, from the digital data recording and/or reproducing apparatus 520 is received through the bulk input endpoint 1053.

The first bulk interface 1051 and 1052 of the streaming terminals 1004 and 1010 and the second bulk interface 1052 and 1054 of the interface terminals 1006 and 1012 may be implemented as one interface. That is, only one bulk input endpoint and one bulk output endpoint can be set. Transmission and reception of both control information and streaming data can be performed through these endpoints. According to an exemplary implementation, information to distinguish the type of a data item may be inserted into data to be transmitted and received.

Figure 11:
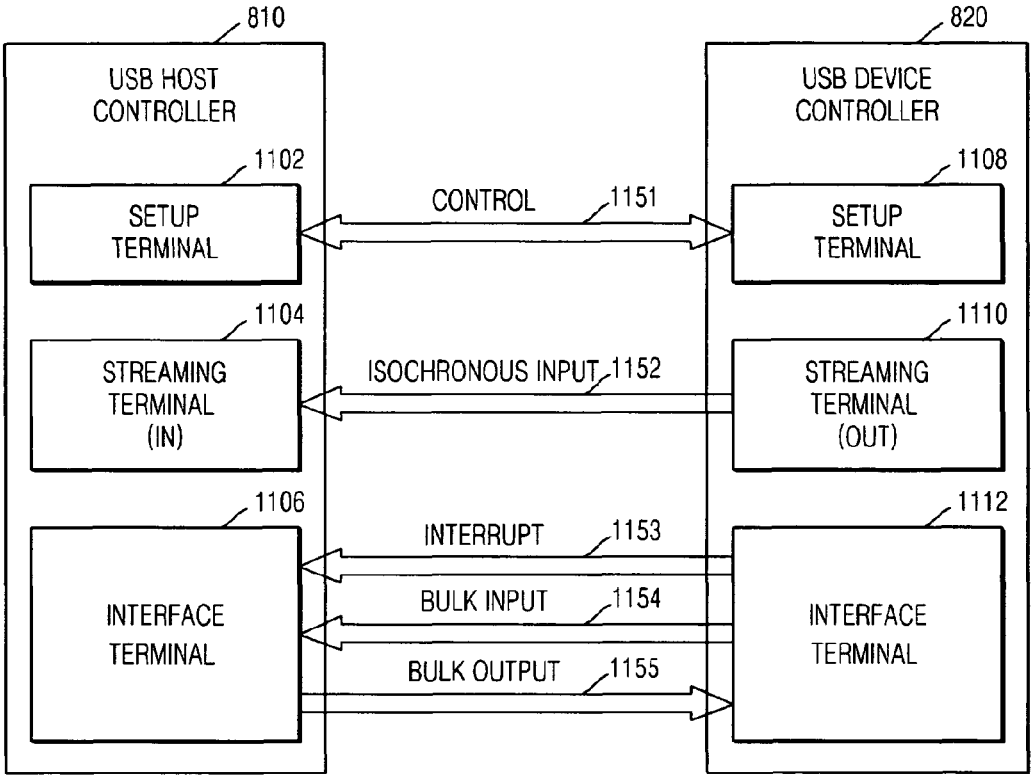
FIG. 11 is a block diagram illustrating an interface structure between a USB host and a USB device according to another exemplary embodiment of the present invention.

FIG. 11 is a block diagram illustrating an interface structure between a USB host and a USB device according to another exemplary embodiment of the present invention.

Similar to the exemplary embodiment of the present invention which is illustrated in FIG. 10, setup terminals 1102 and 1108 include a control endpoint 1151. The control endpoint 1151 is a data pipe for transmitting and receiving information required for a process of setting streaming terminals 1104 and 1110 and interface terminals 1106 and 1112. According to the exemplary embodiment of the present invention as illustrated in FIG. 11, interfaces set through the control endpoint 1151 are an isochronous interface comprising an isochronous input endpoint 1152 of the streamlining terminals 1104 and 1110, an interrupt interface formed with an interrupt endpoint 1153 of the interface terminals 1106 and 1112, and a bulk interface formed with a bulk input endpoint 1154 and a bulk output endpoint 1155.

The isochronous input endpoint 1152 of the streamlining terminals 1104 and 1110 is a data pipe for transmitting streaming data to a USB host controller 810 from a USB device controller 820, and for transferring an audio and/or video signal decoded in the digital data recording and/or reproducing apparatus 520. If an isochronous output endpoint for downstreaming to the USB device is further disposed, it is possible to implement a storage function in the digital data recording and/or reproducing apparatus 520. For example, it is possible to transmit an output signal of a car audio system to an MP3 player through the isochronous output endpoint to record the output signal.

The interface terminals 1106 and 1112 transmit and receive control information between the USB host 810 and the USB device 820. A control signal, such as a reproduction command, is transmitted to the USB device 820 through the bulk output endpoint 1155. Reproduction state information is transmitted to the digital data recording and/or reproducing apparatus 520 or state information is transmitted after performing other control signals is received through the bulk input endpoint 1154. The interrupt endpoint 1153 is a data pipe for transmitting time-related data that should be processed in a predetermined time, such as time information displayed during reproduction, and time-dependent data, such as lyric information, to the USB host 810. When necessary, the interrupt endpoint 1153 can be defined in an input direction or output direction and then used.

Figure 12:
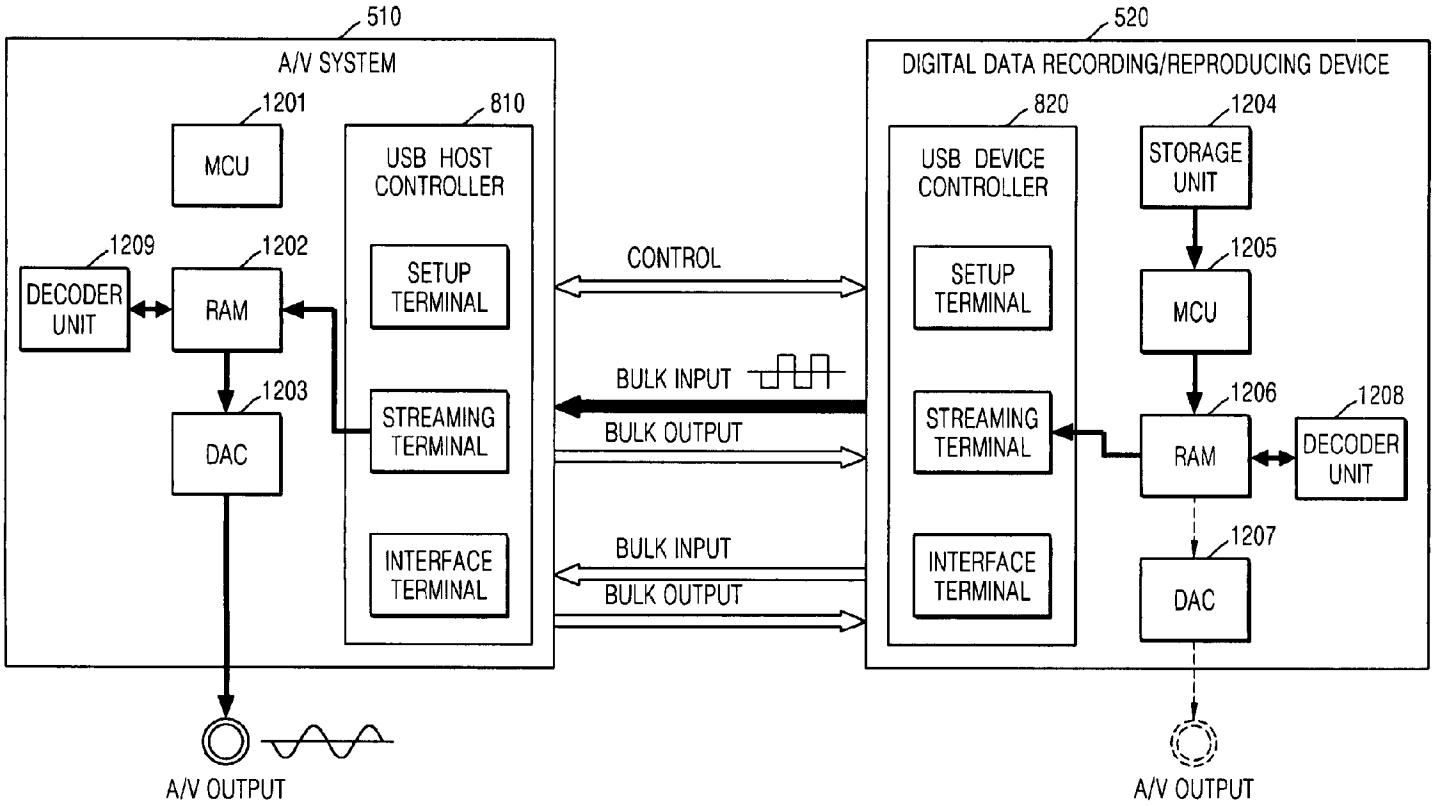
FIG. 12 is a block diagram illustrating a principle of reproducing a multimedia file through a USB interface as illustrated in FIG. 10 according to an exemplary embodiment of the present invention.

FIG. 12 is a block diagram illustrating a principle of reproducing a multimedia file through a USB interface built using the USB interface structure as illustrated in FIG. 10 according to an exemplary embodiment of the present invention. A moving path of streaming data for A/V data reproduction is indicated by black arrows.

Referring to FIG. 12, a digital data recording and/or reproducing apparatus 520 comprises a storage unit 1204, an MCU 1205, a RAM 1206, a D/A conversion unit (DAC) 1207, and a USB device controller 820. The storage unit 1204 is a storage device, such as a flash memory, and stores a multimedia file encoded in a predetermined format. The MCU 1205 that is a control unit reads digital data to be reproduced from the storage unit 1204, decodes the data through the decoder unit 1208, generates raw data, such as PCM and BMP data, and then, loads the data in the RAM 1206. In this process, a file that is encrypted according to DRM is decrypted before the decoding. The USB device controller 820 has logical data pipes, including a setup terminal, described above, and performs upstreaming of the raw data stored in the RAM 1206 through a bulk interface of a streaming terminal. If data loaded in the RAM 1206 is audio data, the data is transferred to the DAC 1207 and output when the data is reproduced in the digital data recording and/or reproducing apparatus 520. If the data is video data, the data is transferred to an LCD controller (not shown) and converted into analog data and then, output when the data is reproduced in the digital data recording an/or rep. However, when data is reproduced through the A/V system 510, up streaming of the data to the A/V system 510 is performed through the USB control interface 810 and 820. The raw data mentioned in the exemplary embodiment of the present invention is not limited to data with predetermined formats, such as PCM and BMP, and can be generated in a variety of formats.

Referring to FIG. 12, the A/V system comprises an MCU 1201, a RAM 1202, a DAC 1203, a decoder unit (DSP) 1209, and a USB host controller 810. The USB host controller 810 receives streaming data from the digital data recording and/or reproducing apparatus 520 through a bulk interface of the streaming terminal and loads the data in the RAM 1202. If the loaded data is audio data, the DAC 1203 converts the data into analog data, and if the loaded data is video data, the LCD controller (not shown) converts the data into analog data, and then, the converted data is output.

Also, information on a file that is produced can be requested and received through a bulk interface of the interface terminal and can be output to a display (not shown) of the A/V system 510. Operation commands other than the reproduction command, and the results of executing the commands are also transmitted and received through a bulk interface of the interface terminal, and the result can be displayed if required.

Meanwhile, the bulk output endpoint of the streaming terminal can be used for downstreaming from the A/V system 510. The digital data recording and/or reproducing apparatus 520 encodes streaming data received through the bulk output endpoint and stores the data in the storage unit 1204.

Figure 13:
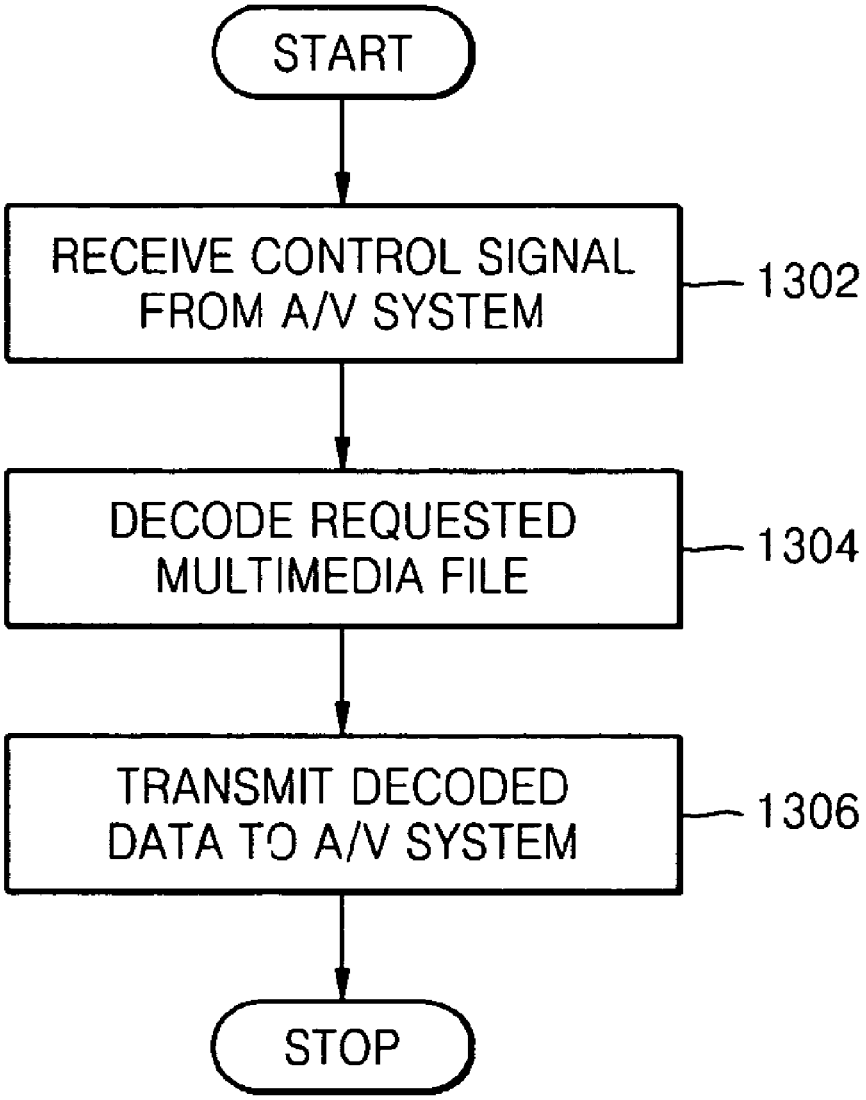
FIG. 13 is a flowchart illustrating a method of reproducing a multimedia file through an external device in a digital data recording and/or reproducing apparatus according to an exemplary embodiment of the present invention.

FIG. 13 is a flowchart illustrating a method of reproducing a multimedia file through an external device, where the multimedia file is stored in a digital data recording and/or reproducing apparatus, according to an exemplary embodiment of the present invention.

Referring to FIG. 13, a control signal from an external device (A/V system) is received in step 1302. If the received control signal is a reproduction command, the requested multimedia file is decoded in step 1304.

The decoded data is transmitted to the external device in step 1306.

Data communication with the external device can be performed through a USB device controller. The USB device controller, as described above, is built to include a first bulk interface or an isochronous interface for transmission and reception of a synchronization signal and data streaming, and a second bulk interface and/or an interrupt interface for transmitting and receiving control information. According to an exemplary implementation, an identical bulk interface may be used to transmit and receive control information and streaming data.

Figure 14:
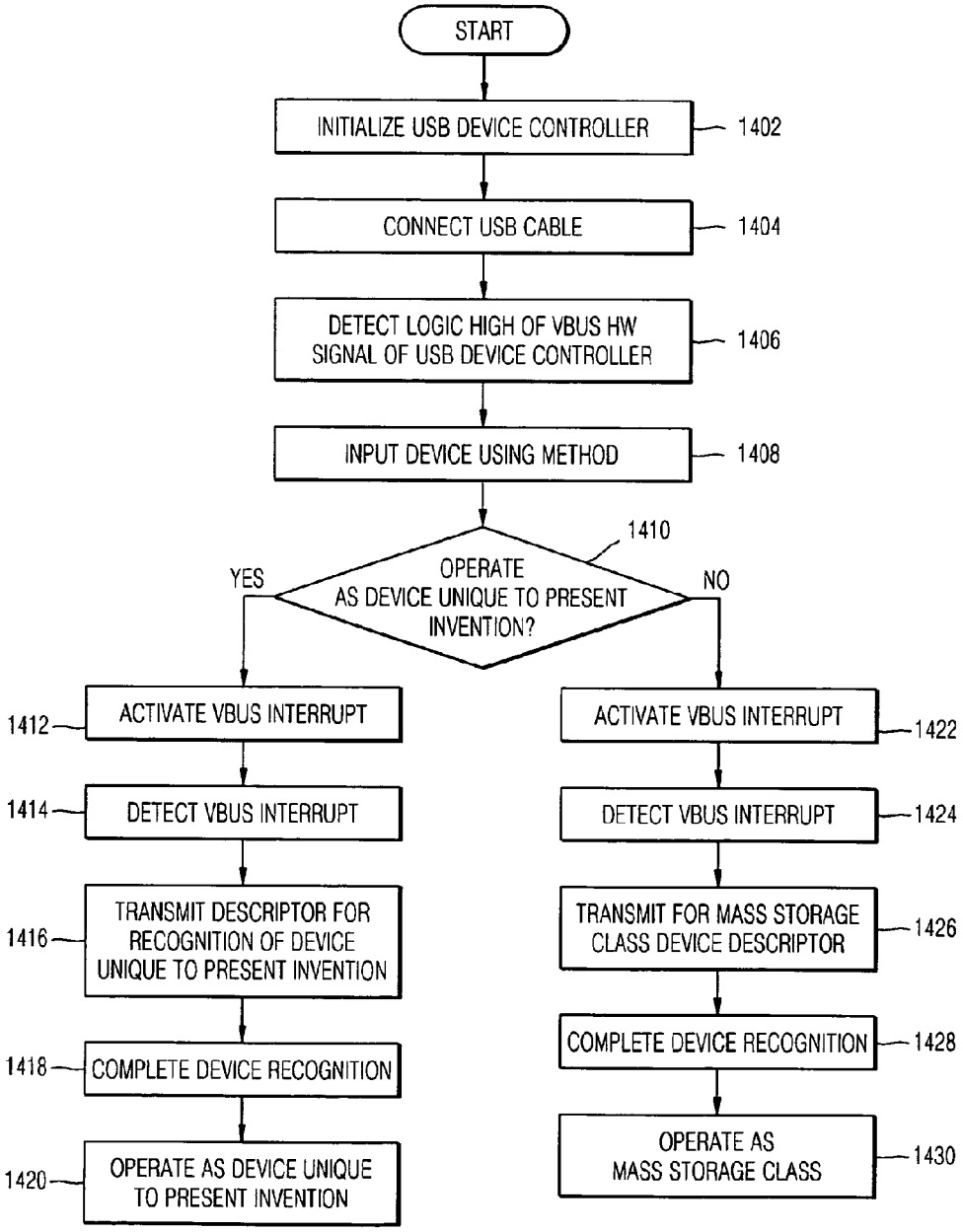
FIG. 14 is a flowchart illustrating a method of operating a digital data recording and/or reproducing apparatus as an apparatus according to an exemplary embodiment of the present invention or as an apparatus of a different type according to an external input.

FIG. 14 is a flowchart illustrating a method of operating a digital data recording and/or reproducing apparatus as an apparatus according to an exemplary embodiment of the present invention or as an apparatus of a different type according to an external input.

Referring to FIG. 14, first, a USB controller is initialized in step 1402. A user connects a USB cable between an A/V system and a digital data recording and/or reproducing apparatus in step 1404. In step 1406, if a VBUS HW signal of the USB controller is detected to be logic high, the digital data recording and/or reproducing apparatus recognizes that the USB device controller is connected to a USB host controller. In step 1408, the digital data recording and/or reproducing apparatus provides an interface for the user to input a device using method. This interface facilitates the user's selection of whether the digital recording and/or reproducing apparatus operates using a conventional standardized USB protocol, or operates as a device unique to the present invention. For example, the user can select whether the apparatus is used as a conventional portable device or the apparatus is used to transmit DRM-decrypted raw data in a predetermined format according to the present invention. If the user inputs a device using method in step 1408, a determination of whether to operate as the device unique to the present invention in step 1410 is made. In the method of selecting an operation type, the user may use buttons or may input an operation type through a GUI, such as a menu screen. The operation type can be configured to automatically change when the apparatus is connected.

In order to operate as the device unique to the present invention, a predetermined protocol suitable for transmission of raw data that is not a conventional USB protocol is needed. In an A/V system, the protocol can be updated through a recording medium, such as a CD or a portable memory. When a change to the operation type is required, the protocol file can be uploaded from the ROM or storage medium to change the protocol after the protocol has been stored in a ROM of a portable device or a storage medium.

When the digital data recording and/or reproducing apparatus is operating as the device unique to the present invention, a VBUS interrupt is activated in step 1412, the VBUS interrupt is detected in step 1414, and descriptor information for recognition of the device unique to the present invention is transmitted to the setup terminal of the USB host controller through a control endpoint in step 1416. The USB host controller performs an enumeration procedure forming endpoints for transmission and reception of data and completes recognition of the device in step 1418. As a result of the recognition, a USB interface, as illustrated in FIG. 11 or 12, is formed and preparation for communication is finished. From this point, the digital data recording and/or reproducing apparatus operates as the device unique to the present invention, not as a portable device, such that a multimedia file can be reproduced through the A/V system in step 1420.

When the digital data recording and/or reproducing apparatus operates. as a portable device according to Mass Storage Class, a VBUS interrupt is activated in step 1422, the VBUS interrupt is detected in step 1424, descriptor information for recognition of the portable device is transmitted in step 1426, and the recognition of the device is completed in step 1428. As a result of the recognition, a USB interface to use the apparatus as the portable device is formed and preparation for communication is finished. From this point, the digital data recording and/or reproducing apparatus operates as a portable device in step 1430.

Figure 15:
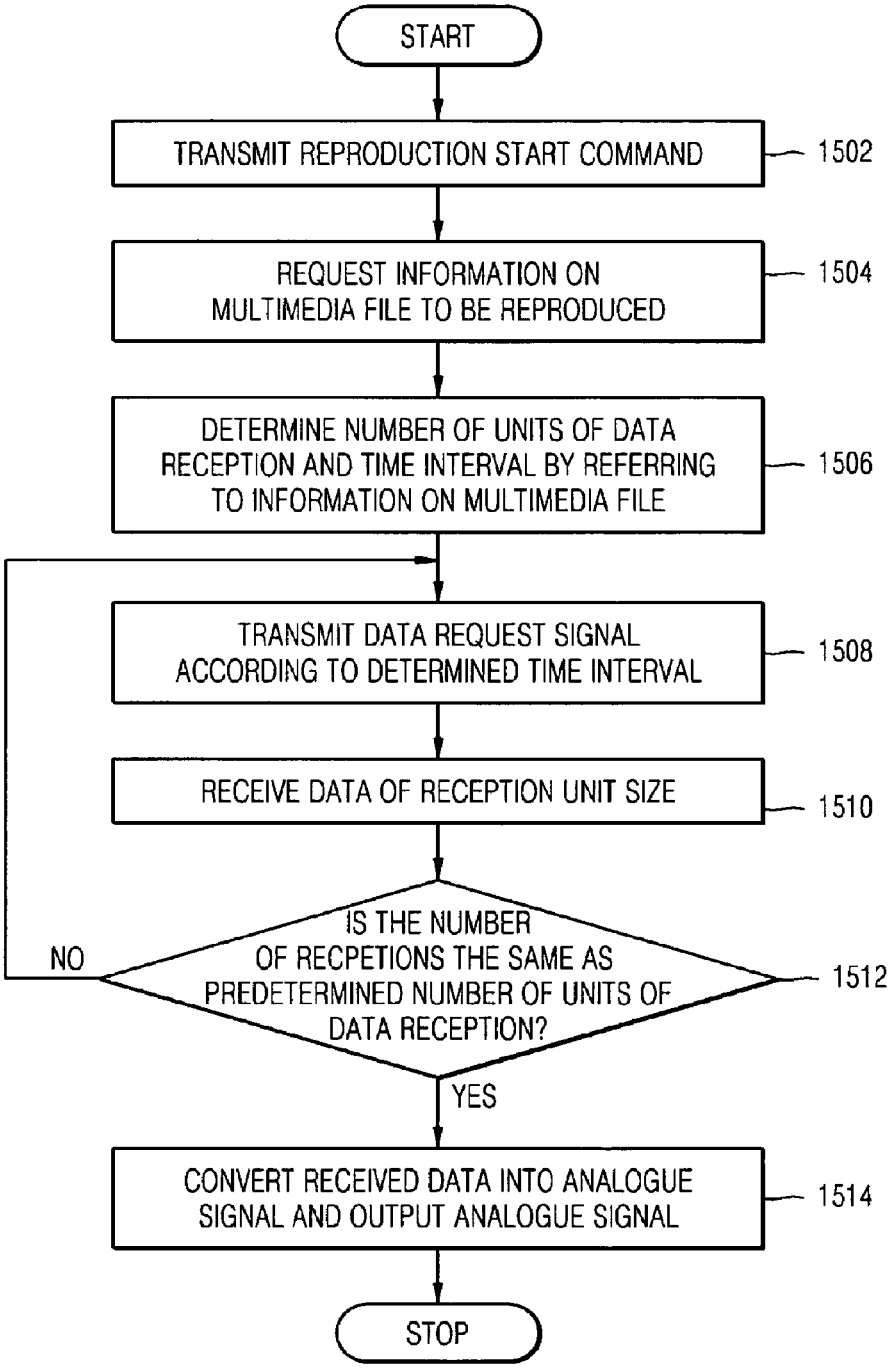
FIG. 15 is a flowchart illustrating a method of reproducing a multimedia file of an external device in the A/V system of FIG. 12 according to an exemplary embodiment of the present invention.

FIG. 15 is a flowchart illustrating a method of reproducing a multimedia file of the external device 520 in the A/V system 510 of FIG. 12 according to an exemplary embodiment of the present invention.

Referring to FIG. 15, the A/V system 510 transmits a control signal to control a digital data recording and/or reproducing apparatus 510 through a first or second bulk interface. The transmitted control signal is transferred to an MCU through a USB device controller and a RAM. If a reproduction start command is transmitted to the digital data recording and/or reproducing apparatus 520 in step 1502, the digital data recording and/or reproducing apparatus 520 is in a state in which the digital data recording and/or reproducing apparatus can reproduce a file.

If the A/V system 510 requests information on a multimedia file which is desired to be reproduced, through the first or second bulk interface in step 1504, the digital data recording and/or reproducing apparatus 520 transmits information on the multimedia file through the first or second bulk interface as a response. By referring to the received file information, the A/V system 510 determines the number of units of data reception, a reception unit, and a time interval in step 1506. According to the determined time interval, the A/V system 510 transmits a control signal requesting data to the digital data recording and/or reproducing apparatus 520 in step 1508.

For example, if the file to be received and reproduced is an MP3 file, the size of PCM data of 1 frame is 4608 bytes and a reproduction interval is 26 msec. Accordingly, each request for streaming is transmitted with an interval of 26 msec. In addition to audio compression files, such as WMA and OGG files, video compression files also have different data sizes and intervals.

The MCU that is a control unit of the digital data recording and/or reproducing apparatus 520 sequentially decodes each predetermined unit of the multimedia file by using a decoder according to a sequential frame reproduction command from the A/V system 510. The MCU also transmits the decoded file through the first bulk interface. The MCU of the A/V system 510 receives data in reception units in step 1510. Until the number of receptions of reproduced data is equal to the number of receptions determined to be required by referring to the size of data to be received in step 1512, steps 1508 and 1510 are repeatedly performed. Then, the received data is converted into analog data and then output in step 1514. If the data is encrypted data, the data is decrypted and then output. If an exemplary embodiment of the present invention uses a bulk interface for transmission of streaming data in relation to the size of a multimedia file, the A/V system may omit a synchronization process required between the two devices. This is significantly different from an embodiment that uses an isochronous interface.

Figure 16:
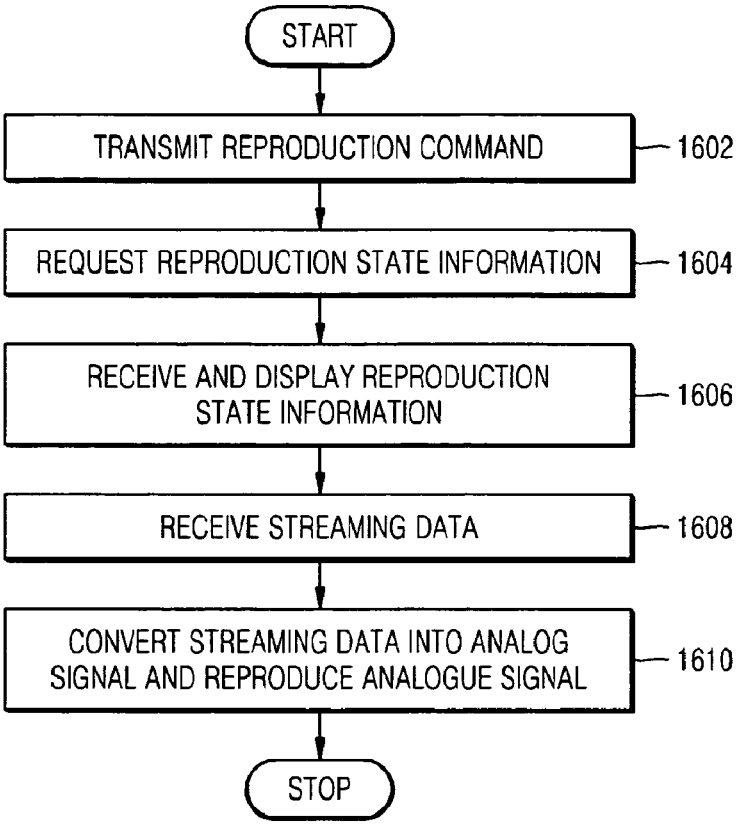
FIG. 16 is a flowchart illustrating a method of reproducing a multimedia file of an external device in the A/V system of FIG. 12 according to another exemplary embodiment of the present invention.

FIG. 16 is a flowchart illustrating a method of reproducing a multimedia file of the external device 520 in the A/V system 510 of FIG. 12 according to another exemplary embodiment of the present invention.

Referring to FIG. 16, if the user presses a reproduction button of the A/V system 510, a reproduction command is transmitted through a bulk interface in step 1602. Certain exemplary embodiments of the present invention may be implemented so that the user's reproduction command is received through an input unit of the digital data recording and/or reproducing apparatus 520 and a control signal corresponding to the input is transmitted to the A/V system 510. This can be applied to the exemplary embodiment of the present invention illustrated in FIG. 15. When the reproduction command is transmitted, the A/V system can request reproduction state information together in step 1604. The reproduction state information received from the digital data recording and/or reproducing apparatus 520 is output to a display in step 1606. In step 1608 streaming data corresponding to a file of which reproduction is requested is received through an isochronous interface or bulk interface as a response to the reproduction command The received streaming data is converted into analog data and reproduced in step 1610.

In the exemplary embodiments of the present invention illustrated in FIGS. 15 and 16, the streaming data is decrypted using this encryption key and then, converted into analog data and reproduced when an encryption key is received from the digital recording and/or reproducing apparatus 520. When encoded data that is not decoded raw data, is received, a process of decoding the data is subsequently required. This is because the size of decoded raw data is relatively larger, and the A/V system 510 receives compressed data decodes the data, and then, reproduces the decoded data.

Figure 17:
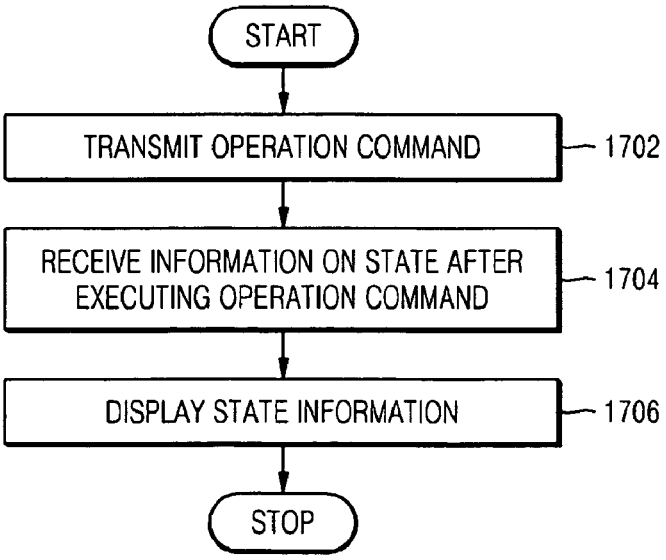
FIG. 17 is a flowchart illustrating a method of executing an operation command of a digital data recording and/or reproducing apparatus by the A/V system of FIG. 12 according to an exemplary embodiment of the present invention.

FIG. 17 is a flowchart illustrating a method of executing an operation command of a digital data recording and/or reproducing apparatus 520 by the A/V system 510 of FIG. 12 according to an exemplary embodiment of the present invention.

Referring to FIG. 17, an operation command is initially transmitted to the digital data recording and/or reproducing apparatus 520 through a bulk interface in step 1702. The operation command is selected through a user input unit 913, and operation commands include 'reproduction', 'pause', and 'next song', among others. Once the operation command is executed, information on a state of the operation may be received from the multimedia file recording and/or reproducing apparatus 520 in step 1704. The received state information is displayed in step 1706 or used as control information.

Figure 18:
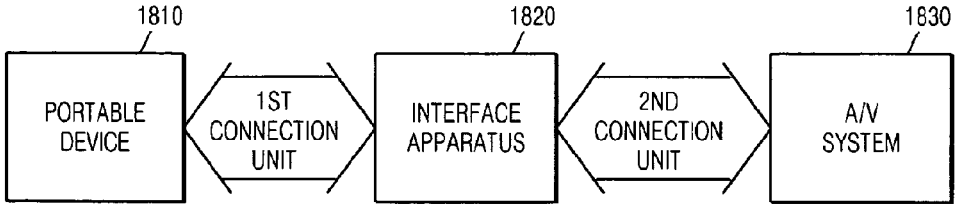
FIG. 18 is a block diagram illustrating an interface apparatus used to control a digital data recording and/or reproducing apparatus from an A/V system according to an exemplary embodiment of the present invention.

FIG. 18 is a block diagram illustrating an interface apparatus 1820 used to control a portable multimedia file recording and/or reproducing apparatus 1810 from an A/V system 1830 according to an exemplary embodiment of the present invention.

Referring to FIG. 18, the interface apparatus 1820 according to the exemplary embodiment of the present invention is connected to the portable device 1810 through a first connection unit, and to the A/V system 1830 through a second connection unit. The interface apparatus 1820 may comprise a first connection unit, a second connection unit and an interface processing unit. The first connection unit connects the portable device 1810 and the second connection unit connects the A/V system 1830. The interface processing unit converts the data format of the first connection unit into the data format of the second connection unit, or converts the data format of the second connection unit into the data format of the first connection unit, and outputs the converted data.

According to an exemplary embodiment of the present invention, the first connection unit and the second unit may be implemented as a USB connection unit and a serial connection unit, respectively. However, the first and second connection units are not limited to those of predetermined protocols. According to an exemplary implementation, the A/V system 1830 can be used without any modification, and the portable device 1810 only needs to be upgraded with firmware supporting a USB device according to the present invention.

Figure 19:
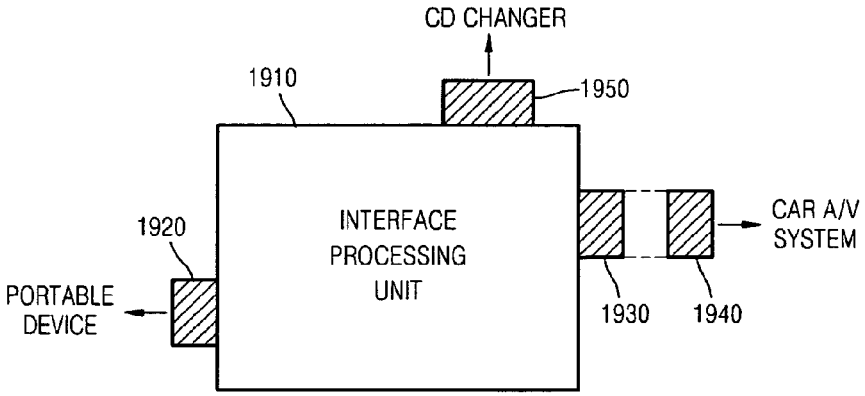
FIG. 19 is a diagram illustrating a structure of an interface apparatus according to an exemplary embodiment of the present invention.

FIG. 19 is a diagram illustrating an interface apparatus applied to a car A/V system according to an exemplary embodiment of the present invention. In this case, the interface apparatus is connected between a CD change interface and a USB interface of a portable device.

Referring to FIG. 19, a USB connection unit 1920 and a first serial connection unit 1930 are included in the interface apparatus. The USB connection unit 1920 connects the portable device to a USB cable, and a first serial connection unit 1930 connects the car A/V system to a serial cable that is the CD changer interface. An interface processing unit 1910 is a module processing a link between the car A/V system and the portable device and processes conversion of data between the portable device and the car A/V system. Data received from the portable device through the USB connection unit 1920 is converted into a format that complies with a protocol for connection with the car A/V system. The data is then output to the car A/V system through the first serial connection unit 1930, and data received from the car A/V system through the first serial connection unit 1930 is converted into a USB data format and output to the portable device through the USB connection unit 1920.

Figure 20:
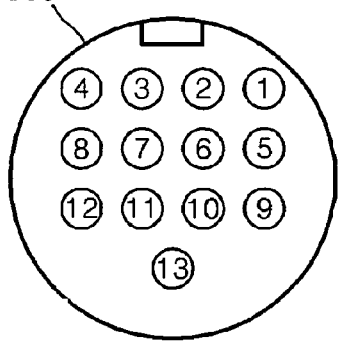
FIGS. 20 and 21 are diagrams illustrating pin arrangements of serial cables used in a car A/V system according to an exemplary embodiment of the present invention.
Figure 21:
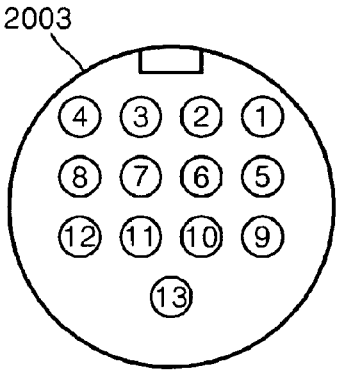

FIGS. 20 and 21 are diagrams illustrating pin arrangements of serial cables used in an A/V system according to an exemplary embodiment of the present invention.

FIGS. 20 and 21 illustrate the numbering of pin arrangements 2001 and 2003 of serial cables connected to a head unit. This numbering is identical. However, the use of each pin of the pin arrangements 2001 and 2003 is set differently by each car A/V system manufacturer as shown in the charts 2002 and 2004, respectively. For example, serial cables, such as M-BUS of Alpine, IP-BUS of Pioneer, C-BUS of Clarion, and ACP BUS of Ford, employ different connection protocols, respectively. Hereinafter, a term, X-BUS, will be used to collectively indicate interfaces of all manufacturers between a car A/V system and a CD changer.

According to an exemplary embodiment of the present invention as illustrated in FIG. 19, a conversion unit 1940 may also be included. The conversion unit 1940 is connected to the front end of the first serial connection unit 1930 and converts pin inputs of the car A/V system to fit the pin arrangement of the first serial connection unit 1930. This is a hardware-based method to correctly input data to a corresponding pin. If there is no conversion unit 1940, a software-based data conversion is required because data input to the interface processing unit 1910 has a different structure defined by each manufacturer. The software-based data conversion is achieved by using a microcontroller 2204 of FIG. 22.

The interface apparatus may further include a second serial connection unit 1950 for connection to and for use with the CD changer. A user's desire to use the portable device or the CD changer may be input through an input unit (not shown), such as buttons. If the user selects the CD changer as the device to be used, data of the CD changer can be reproduced through a bypass unit (not shown) by directly connecting the first serial connection unit 1930 and the second serial connection unit 1940.

Figure 22:
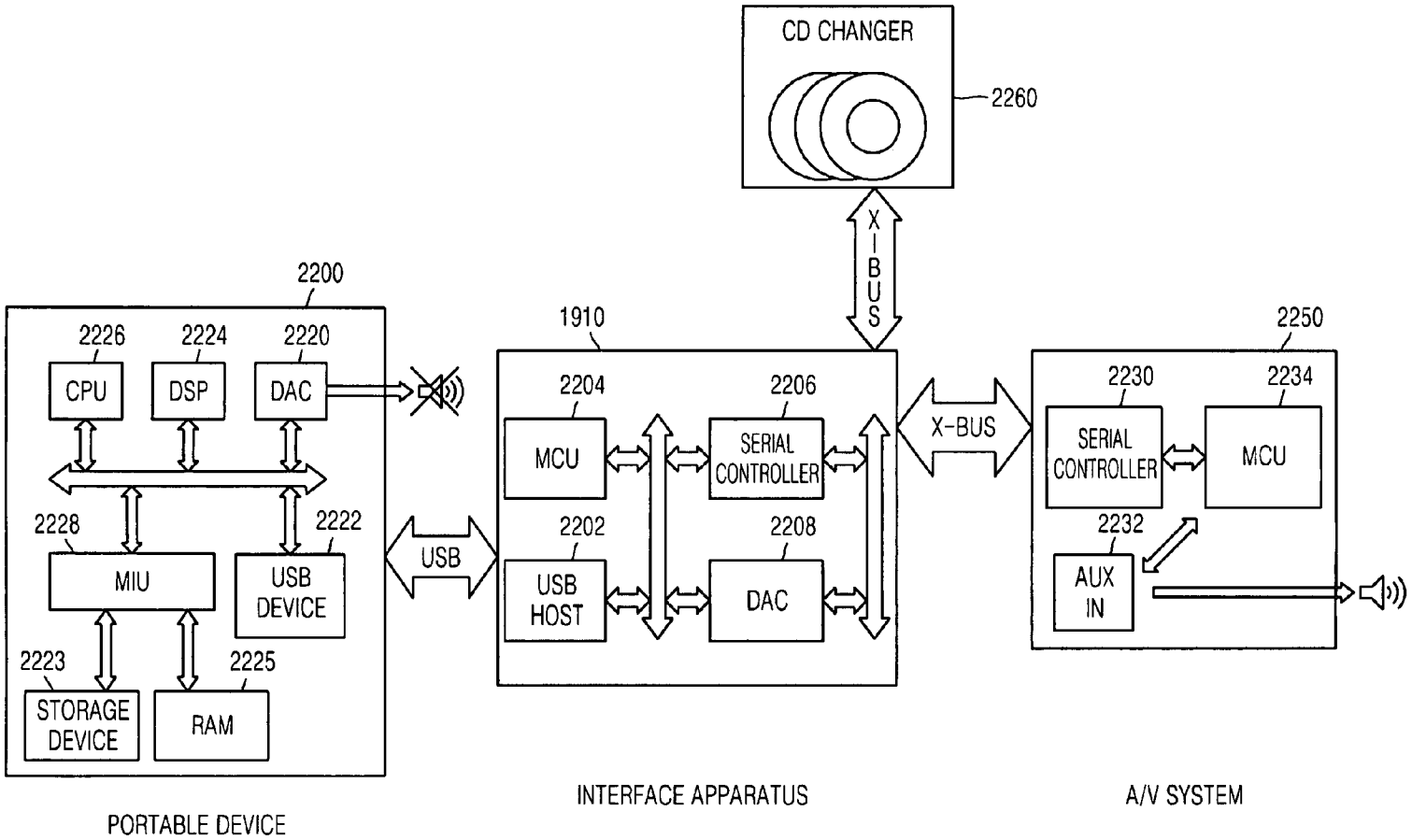
FIG. 22 is a diagram illustrating a detailed structure of the interface apparatus of FIG. 19 and a connection thereof to an A/V system and a portable device according to an exemplary embodiment of the present invention.

FIG. 22 is a diagram illustrating a detailed structure of the interface apparatus of FIG. 19 and a connection to an A/V system and a portable device according to an exemplary embodiment of the present invention.

Referring to FIG. 22, the interface processing unit 1910 of the interface apparatus comprises a USB host controller 2202, a serial controller 2206, an MCU 2204, and a D/C conversion unit 2208. As illustrated in FIG. 22, the interface processing unit 1910 is connected to a portable device 2200 through a USB interface. The interface processing unit 1910 is connected to a car A/V system 2250 and a CD changer 2260 through an X-BUS interface. Also, when the portable device 2200 is operating as a portable disc (Mass Storage Class), the interface processing unit 1910 may further include a digital signal processor (DSP, not shown) decoding files received from the portable device 2200. When the portable device 2200 is an MP3 player, the DSP plays a role of an MP3 decoder.

The USB host controller 2202 controls data communication with the portable device 2200 through a USB connection unit 1920 (shown on FIG. 19) of the interface processing unit 1910. The USB host communicates with a USB device controller 2222 of the portable device 2200. The serial controller 2206 controls data communication with the car A/V system 2250 through a first serial connection unit 1930 (shown on FIG. 19) and communicates with a serial controller 2230 of the car A/V system 2250.

The MCU 2204 converts a control signal input from the serial controller 2206 into a USB command and outputs the USB command to the USB host controller 2202. Also, the MCU 2204 converts reproduction information input from the USB host controller 2202 into data complying with the protocol for connection with the car A/V system 2250 and outputs the converted data to the serial controller 2206.

The portable device 2200 is a multimedia file recording and/or reproducing apparatus which comprises a central processing unit (CPU) 2226, a DSP 2224, a DAC 2220, a memory interface unit (MIU) 2228, a storage device 2223, a RAM 2225 and the USB device controller 2222. If the portable device 2200 receives a reproduction command through the USB host controller 2202, the portable device 2200 does not directly reproduce a stream decoded through the DSP 2224 or a codec (not shown), but performs up streaming of the stream through the USB device controller 2222.

The interface processing unit 1910 receives multimedia data through the USB host controller 2202. The multimedia data is converted into analog data by the DAC 2208 and transmitted to the car A/V system through the X-BUS. The transmitted data is input to an amplifier (AUX) 2232 and reproduced. This process is analogous to the process involving a CD changer which is connected for reproduction.

Meanwhile, when the user selects the CD changer 2260 as the device to be used, the MCU 2204 controls a bypass unit (not shown) so that data can be communicated directly between the car A/V system 2250 and the CD changer 2260.

The USB interface between the USB device controller 2222 and the USB host controller 2202 of FIG. 22 can be set as the structure illustrated in FIG. 10 or 11.

However, the structure of the USB interface is not limited these structures.

Figure 23:
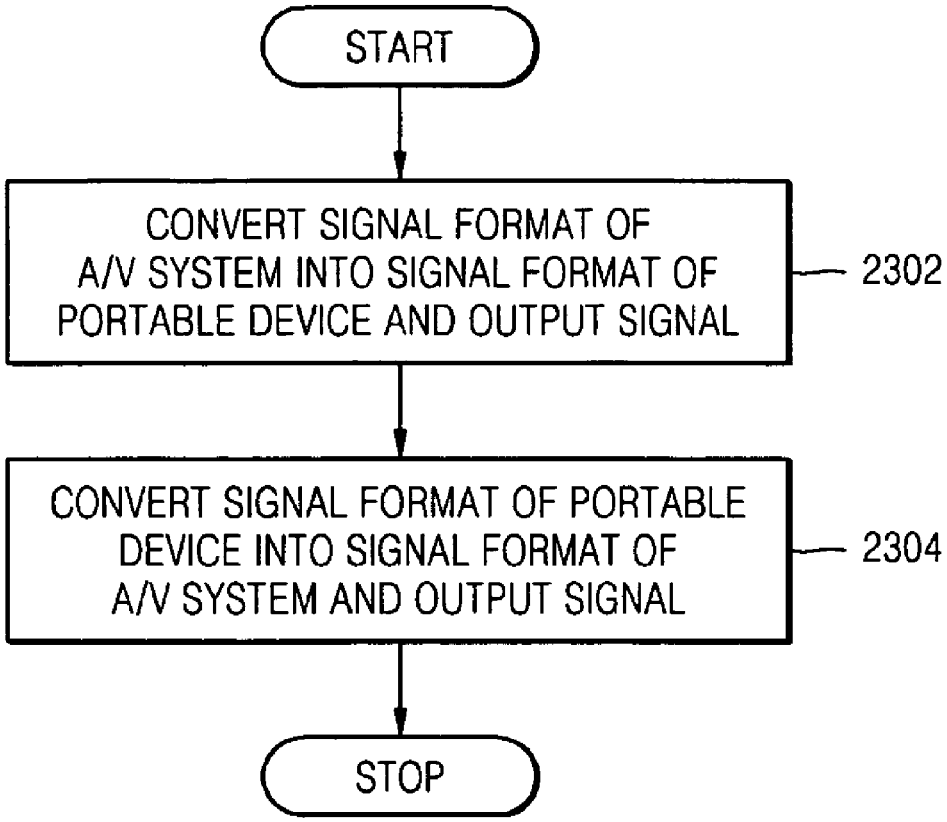
FIG. 23 is a flowchart illustrating an interface method according to an exemplary embodiment of the present invention.

FIG. 23 is a flowchart illustrating an interface method according to an exemplary embodiment of the present invention.

Referring to FIG. 23, the interface apparatus 1820 (see FIG. 18), according to an exemplary embodiment of the present invention, converts the format of a signal of an A/V system into the format of a signal of a portable device. In step 2302, the interface apparatus 1820 outputs the converted signal, and converts the format of a signal of the portable device into the format of a signal of the A/V system and outputs the converted signal in step 2304.

Figure 24:
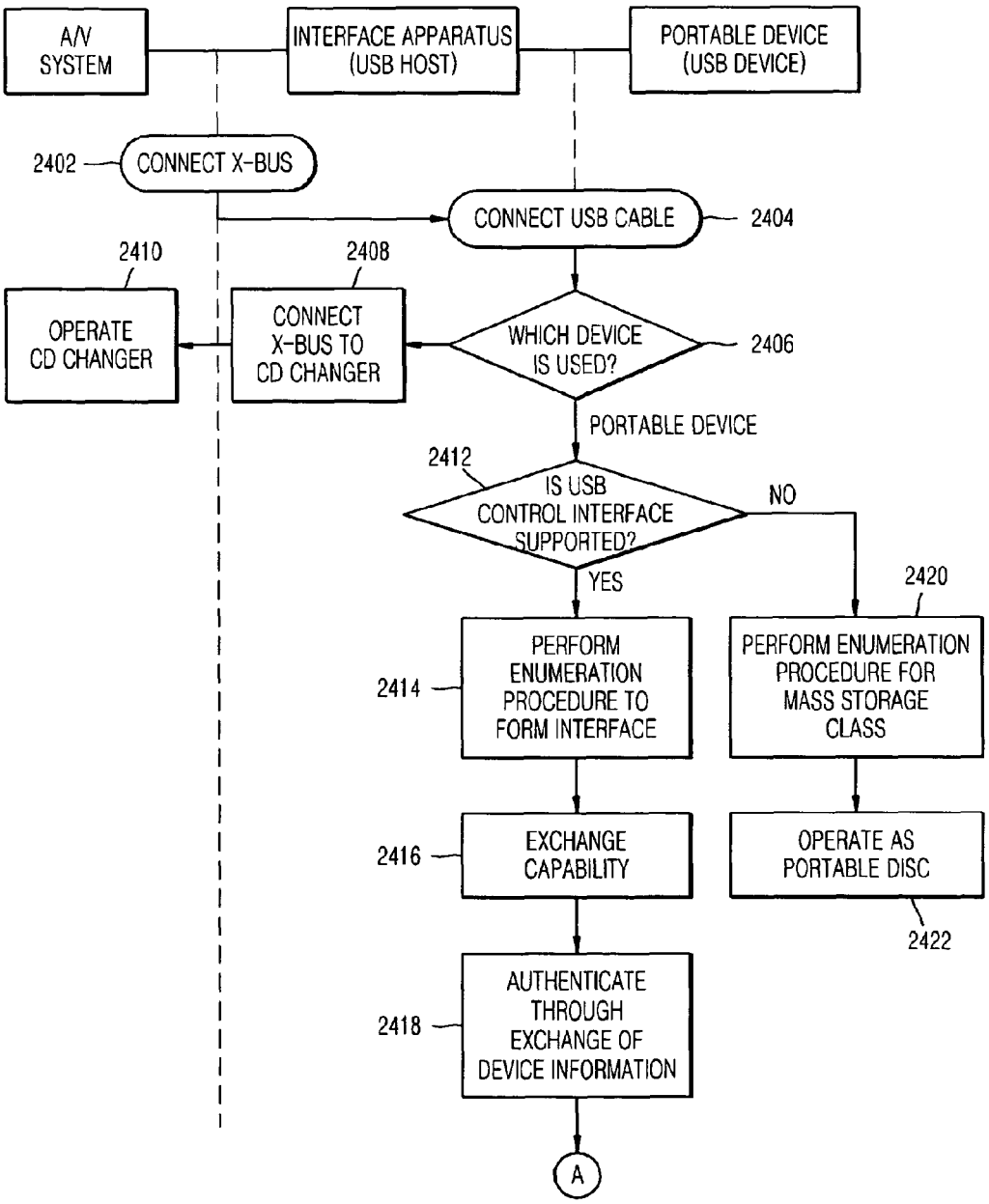
FIG. 24 is a flowchart illustrating a method of connecting an A/V system and a device using an interface apparatus according to an exemplary embodiment of the present invention.

FIG. 24 is a flowchart illustrating a method of connecting an A/V system and a device using an interface apparatus according to an exemplary embodiment of the present invention.

Referring to FIG. 24, if an X-BUS is connected between the car A/V system and the interface apparatus in step 2402, and a USB cable is connected between the interface apparatus and the portable device in step 2404, a determination is made as to whether the device to be used is the portable device or a CD changer in step 2406. If the CD changer is to be used, the X-BUS is connected to the CD changer in step 2408, and a control signal from the car A/V system is transferred to the CD changer so that the CD changer begins operation in step 2410. According to an exemplary implementation, the control signal from the car A/V system is transferred to the CD changer through a second serial connection unit and a path for data communication with the portable device is cut off.

If the portable device is to be used, examination occurs through a USB host and an inquiry is made as to whether the portable device supports a USB control interface according to an exemplary embodiment of the present invention in step 2412. If the portable device supports the USB control interface, an enumeration procedure to form one or more endpoints for data communication is performed referring to descriptor information of a USB device in step 2414. Information required for the enumeration procedure is transmitted and received through the endpoints as described above. If a determination is made in step 2412 that the portable device does not support the USB control interface according to an exemplary embodiment of the present invention, an enumeration procedure for Mass Storage Class is performed in step 2420 because the portable device should be connected as a device according to Mass Storage Class, and then, the portable device begins to operate as a portable disc in step 2422. According to an exemplary implementation, a multimedia file transmitted from the portable device is reproduced through a DSP (decoder) of the interface apparatus.

If the forming of the USB control interface is completed, the two devices exchange information on their functions and specifications so that capability can be verified in step 2416. According to the result of this verification, an operation command and data type to be transmitted and received thereafter are determined.

Also, authentication can be performed by exchanging information on the names of their manufacturers or serial numbers in step 2418. If the authentication fails, the portable device is recognized as a portable disc and operates as a portable disc.

If the authentication is successful, the portable device can be controlled from the car A/V system. First, a control signal from the car A/V system is received through a first serial connection unit. The control signal corresponds to commands, such as 'reproduce', 'pause', and 'next song', among others. The control signal is converted into a USB command, and transmitted to the portable device through a USB connection unit. In response to the control signal, digital data form the portable device is received through the USB connection unit. The received digital data is converted into serial data complying with a protocol for connection to the car A/V system and transmitted to the car A/V system.

Figure 25:
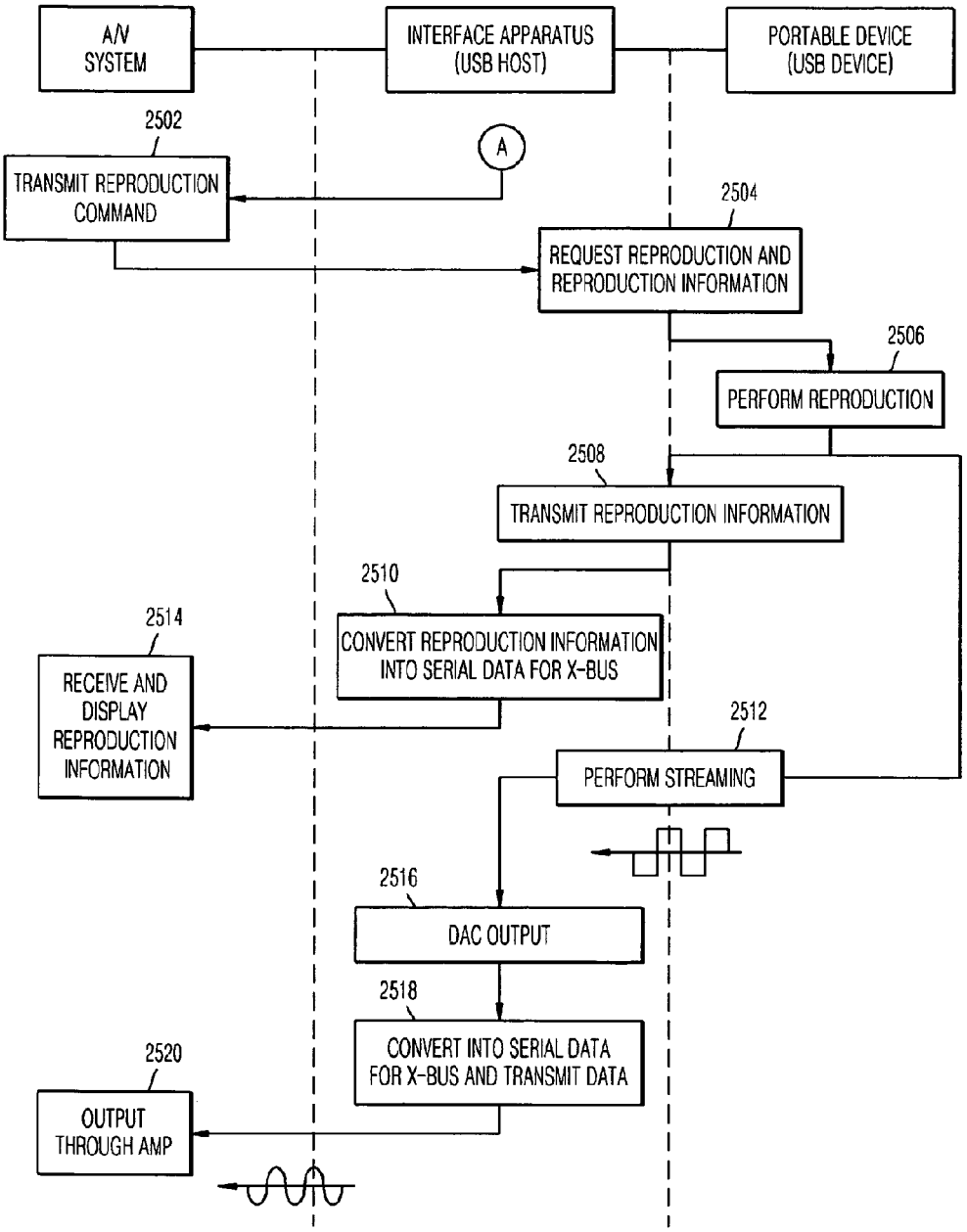
FIG. 25 is a flowchart illustrating a method of reproducing data of a portable device in an A/V system using an interface apparatus according to an exemplary embodiment of the present invention.

FIG. 25 is a flowchart illustrating a method of reproducing data of a portable device in an A/V system using an interface apparatus according to an exemplary embodiment of the present invention. FIG. 11 illustrates an example of the structure of a USB interface which is used. This method may be applied similarly to the structure illustrated in FIG. 10, and may also be applied to other structures of the USB interface.

Referring to FIG. 25, if a user presses a reproduction button of the car A/V system, a control signal (reproduction command) corresponding to the button is transmitted to the interface apparatus in step 2502. The transmitted control signal is converted into a USB command in the interface apparatus and transmitted to the portable device through a bulk output endpoint. At this time, reproduction information is also requested in step 2504. The portable device reads a file of which reproduction is required and decodes the file. The portable device then loads the generated raw data (in the form of BMP or PCM data) on a USB buffer. The loaded data is streamed through an isochronous or bulk input endpoint in step 2512. Reproduction information is simultaneously transmitted through the bulk input endpoint in step 2508.

When the digital data transmitted to the interface apparatus is the reproduction requested multimedia data, the data is converted into analog data through a DAC in step 2516 and transmitted to the car A/V system through the X-BUS in step 2518. The transmitted signal is output through an amplifier in step 2520. When the digital data that is transmitted to the interface apparatus is reproduction information, the information is converted into serial data for the X-BUS and transmitted to the car A/V system in step 2510. The car A/V system receives the reproduction information and displays the information in step 2514.

An exemplary embodiment of the present invention in which a digital data recording and/or reproducing apparatus controls DRM-decrypted data so that the data can be selectively transmitted to a D/A conversion unit or a USB interface will now be explained with reference to FIGS. 26 through 36.

Figure 26:
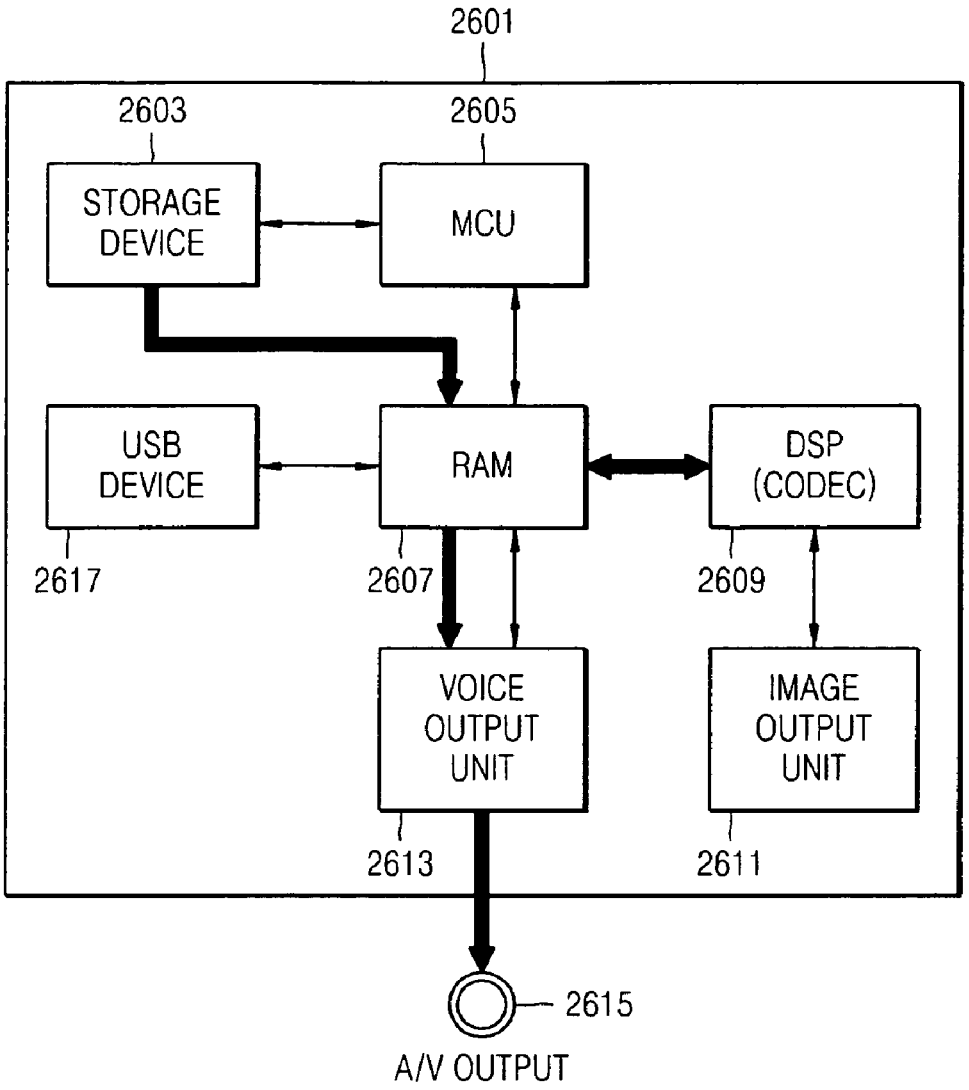
FIG. 26 illustrates a structure of a conventional MP3 reproducing apparatus and a file reproduction data path.

FIG. 26 illustrates a structure of a conventional MP3 reproducing apparatus and a file reproduction data path.

First, an MCU 2605 initializes all elements inside the MP3 reproducing apparatus. Next, the MCU 2605 reads 512 bytes that are part of an MP3 file to be reproduced. Finally, the MCU 2605 stores the data in a RAM 2607. If the storing is completed, the MCU 2605 commands a DSP 2609 that is a reproduction unit, to reproduce the data. If the reproduction is completed, the reproduction unit 2609 stores the reproduced data in a predetermined space of a RAM 2607 allocated in advance by the MCU 2605. The MCU 2605 transfers the stored data to a voice output unit 2613 that is an audio output unit, so that a audio signal can be output.

The MCU 2605 displays a variety of information items, such as file names and the type of codec, which can be obtained after the initialization so that a user can recognize the information through an image output unit 2611. Also, the MCU 2605 repeats the process from the initialization so that an entire MP3 file can be reproduced.

Figure 27:
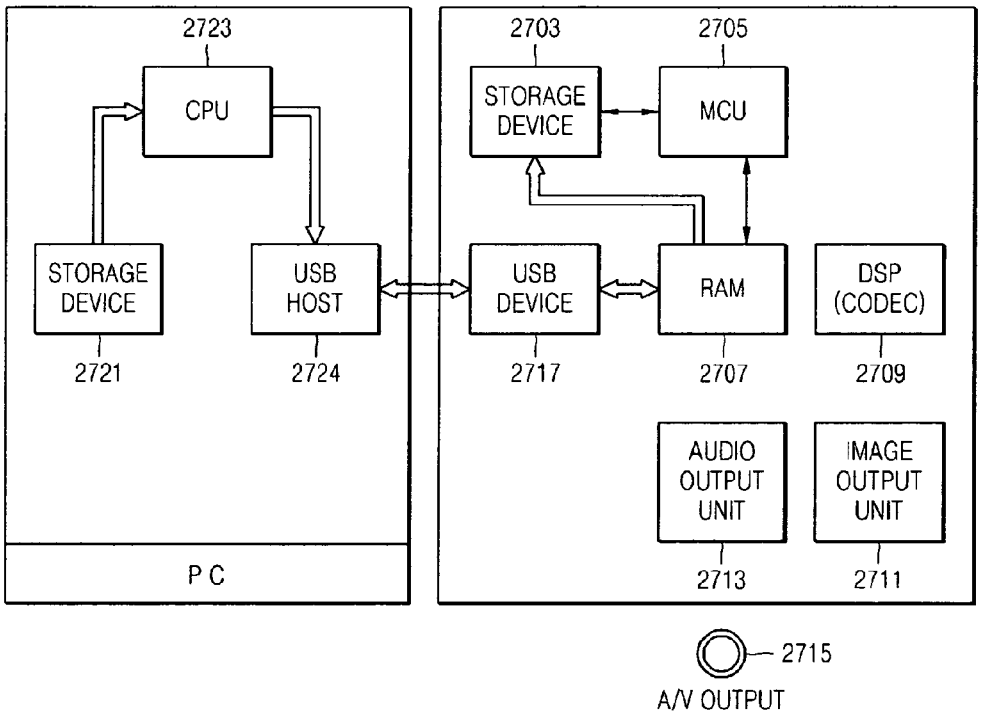
FIG. 27 illustrates a path through which an encrypted MP3 file from a personal computer (PC) is received in a conventional MP3 reproducing apparatus.

FIG. 27 illustrates a path through which an encrypted MP3 file is received in a conventional MP3 reproducing apparatus. The MP3 file is received from a personal computer (PC). FIG. 27 illustrates a process in which a user transmits a file bought through the PC to the MP3 reproducing apparatus. The MP3 file here is protected by a DRM technology.

If the PC and the MP3 reproducing apparatus are initially connected using a USB, information (such as manufacturer, model name, and manufacturing number, among others) unique to the MP3 player is transmitted to the PC. The MP3 file bought by the user is transmitted to the MP3 reproducing apparatus through a CPU 2723 from a storage device 2721, such as a hard disk drive (HDD). At this time, the MP3 file is transmitted in predetermined units according to an encryption method based on the unique information of the MP3 reproducing apparatus transmitted to the PC as described above. A predetermined unit of the file transmitted to a USB device controller 2717 of the MP3 reproducing apparatus through a USB host controller 2724 is stored in a storage device 2703 by an MCU 2705.

Figure 28A:
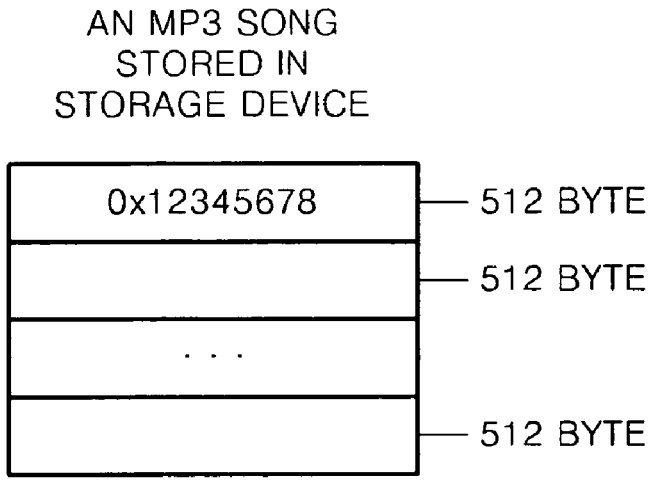
FIGS. 28A and 28B are diagrams illustrating a conventional encryption method.
Figure 28B:
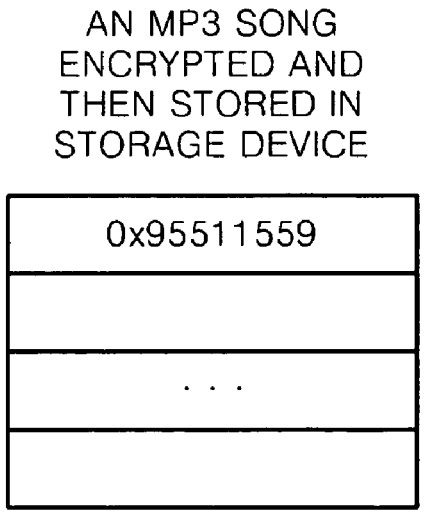

FIGS. 28A and 28B are diagrams illustrating an encryption method according to an exemplary embodiment of the present invention. FIG. 28A illustrates an example of original data, while FIG. 28B illustrates an example of encrypted version of the original data.

Referring to FIGS. 28A and 28B, when it is assumed that part of the original data is "0x12345678", an XOR operation with "0x87654321" is performed and data, "0x95511559", is generated. This state can be regarded as an encrypted state.

Accordingly, if a reproduction unit 2709 does not know that the original data is encrypted with "0x87654321", the data cannot be reproduced normally. However, if a MCU 2705 as described in FIG. 27 decrypts the data and transmits the decrypted data to the reproduction unit 2709. For example, if an XOR operation is performed and data identical to the original data is transmitted, the data can be reproduced.

Encryption: 0x12345678 XOR 0x87654321=0x95511559

Decryption: 0x95511559 XOR 0x87654321=0x12345678

According to an exemplary implementation, '0x87654321' is assumed to be used for the XOR operation and is a value generated for encryption between the PC and the MP3 reproducing apparatus.

This value is known to both devices, but should not be transmitted to the outside of the devices.

Figure 29:
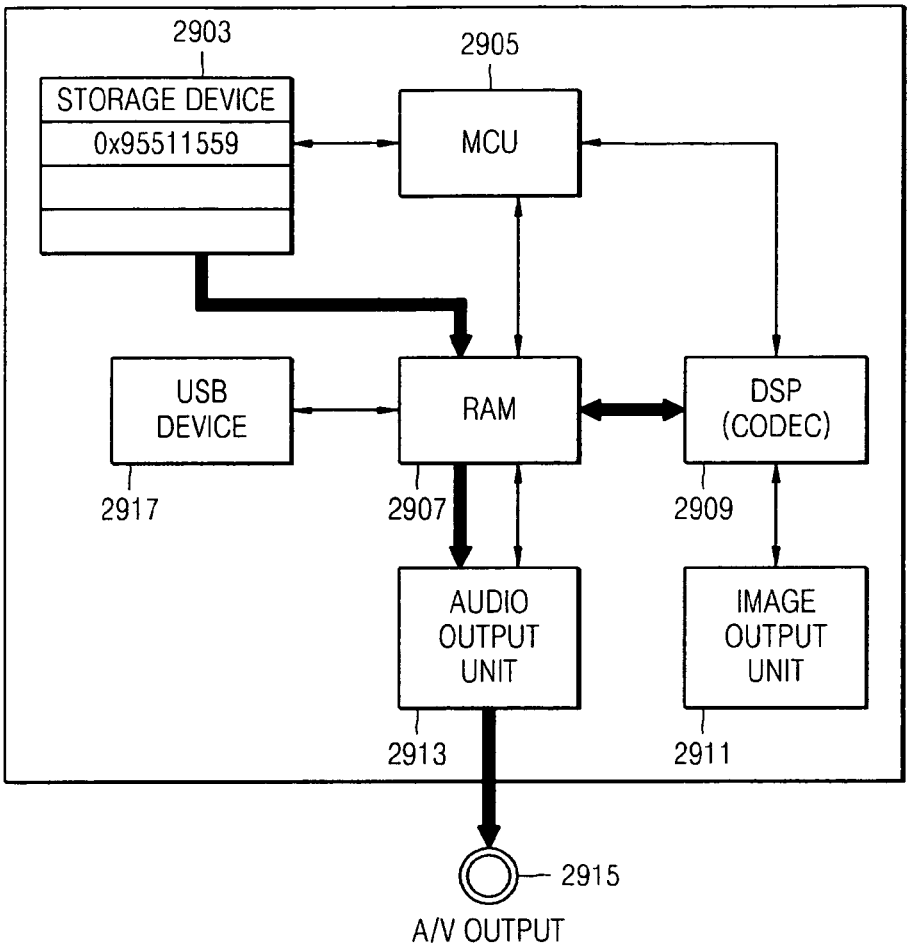
FIG. 29 is a diagram illustrating a data path through which a file encrypted in a conventional MP3 reproducing apparatus is reproduced.

FIG. 29 is a diagram illustrating a data path through which a file encrypted in a conventional MP3 reproducing apparatus is reproduced. The method illustrated in FIG. 29 is similar to the method of reproducing a file in the ordinary MP3 reproducing apparatus (as illustrated in FIG. 26), except that the method of FIG. 29 has an additional operation for decrypting an encrypted MP3 file read from a storage device 2903.

For example, an MCU 2905 reads data, "0x95511559", transmitted through a USB device controller 2917 and then stored in a storage device 2903. Then, the MCU 2905 decrypts the data "0x95511559" with an operation "XOR 0x87654321" to obtain "0x12345678" that represents data identical to the original data, and stores this in a RAM 2907. The stored data is reproduced through a DSP 2909 and output through an audio output unit 2913. Although the original data, "0x12345678", is used for convenience of explanation here, the size and contents of actual data values are different from this value, and the method and values used for encryption operations are not limited to the method illustrated.

Figure 30:
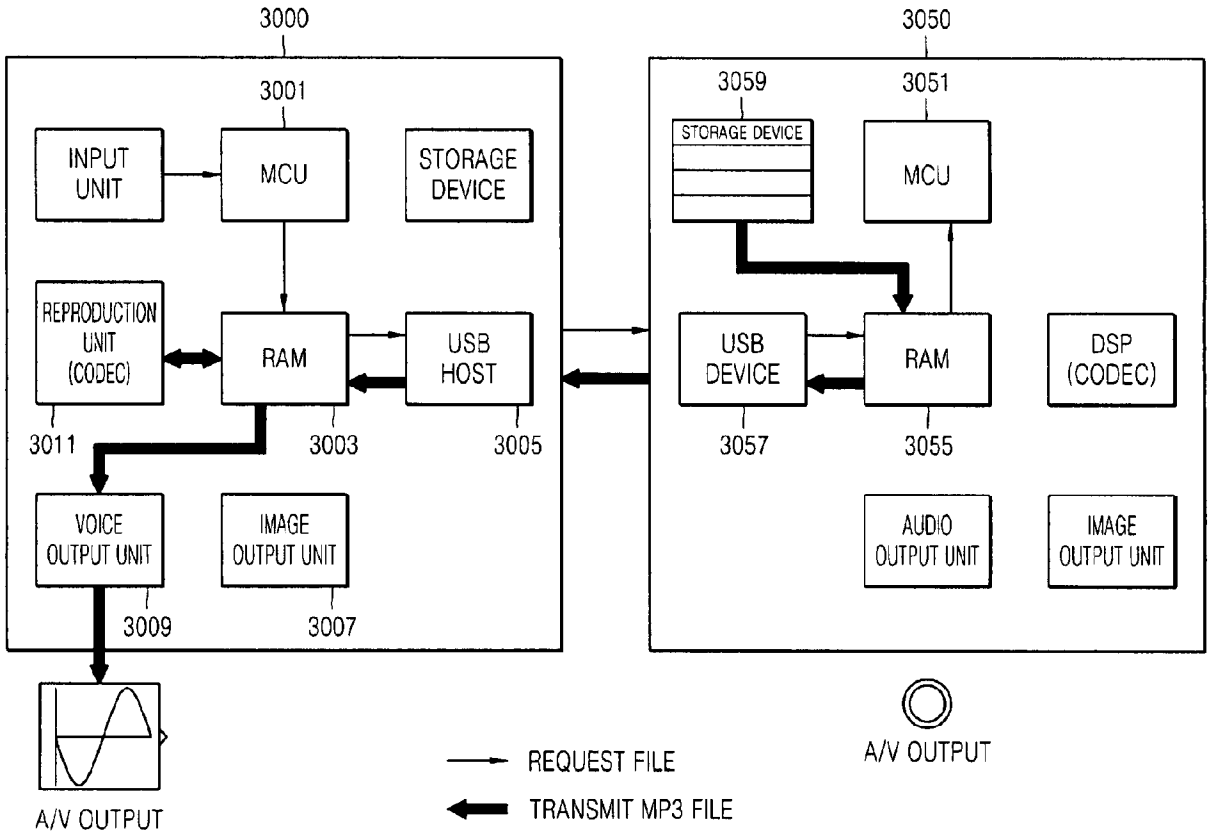
FIG. 30 is a diagram illustrating an example in which an MP3 reproducing apparatus is connected so that the apparatus operates as a conventional portable device.

FIG. 30 is a diagram illustrating an example in which an MP3 reproducing apparatus is connected so that the apparatus operates as a conventional portable device.

Referring to FIG. 30, according to the conventional technology, when a USB host device 3000, such as a PC, is connected to an MP3 reproducing apparatus 3050 through a USB connection, the MP3 reproducing apparatus 3050 operates as a removable device (USB mass storage class). If a user's reproduction request is input through an input unit of the USB host device 3000, a file is requested through a file request path indicated by thin lines in FIG. 30. The requested MP3 file (or other compressed files, such as WMA, and OGG files) is transmitted through a file transmission path indicated by thick lines in FIG. 30.

Figure 31:
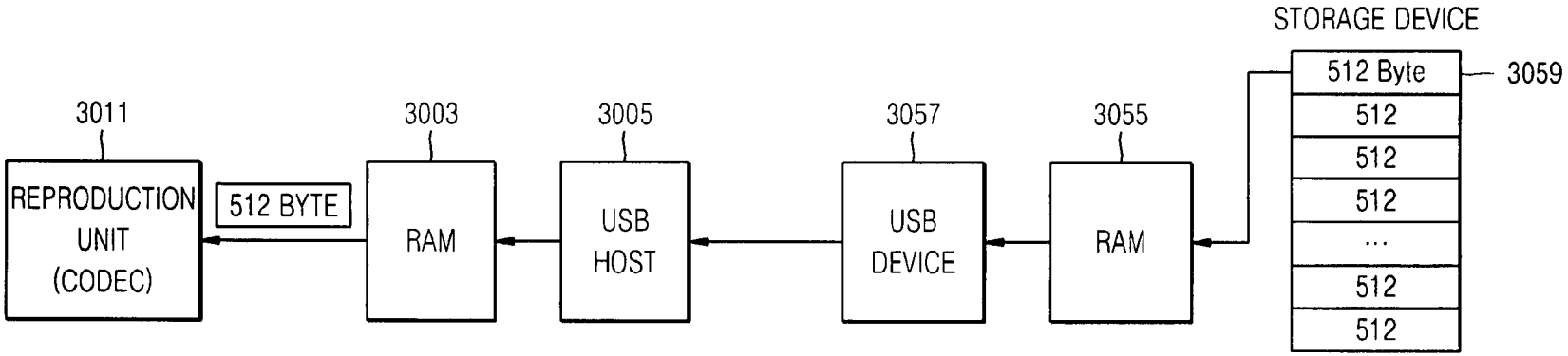
FIG. 31 is a diagram illustrating a path for transferring a requested MP3 file in the arrangement of FIG. 30.

FIG. 31 is a diagram illustrating a path for transferring a requested file in the arrangement of FIG. 30.

Referring to FIG. 31, a requested file is transmitted in predetermined units with respect to a file type. For example, every 512 bytes of the requested file is read and transmitted from a storage device 3059. The data that is read and temporarily stored in a RAM 3055 is transmitted to a USB host controller 3005 through a USB device controller 3057. The transmitted file is stored in a RAM 3003 of a USB host device 3000, reproduced through a reproduction unit 3011, and converted into analog data and output externally through an audio output unit 3009.

If the transmitted 512-byte data is an encrypted value (for example, 0x95511559), the host device 3000 does not have an encryption key (for example, 0x87654321) to reproduce the data and therefore cannot reproduce the data.

Figure 32:
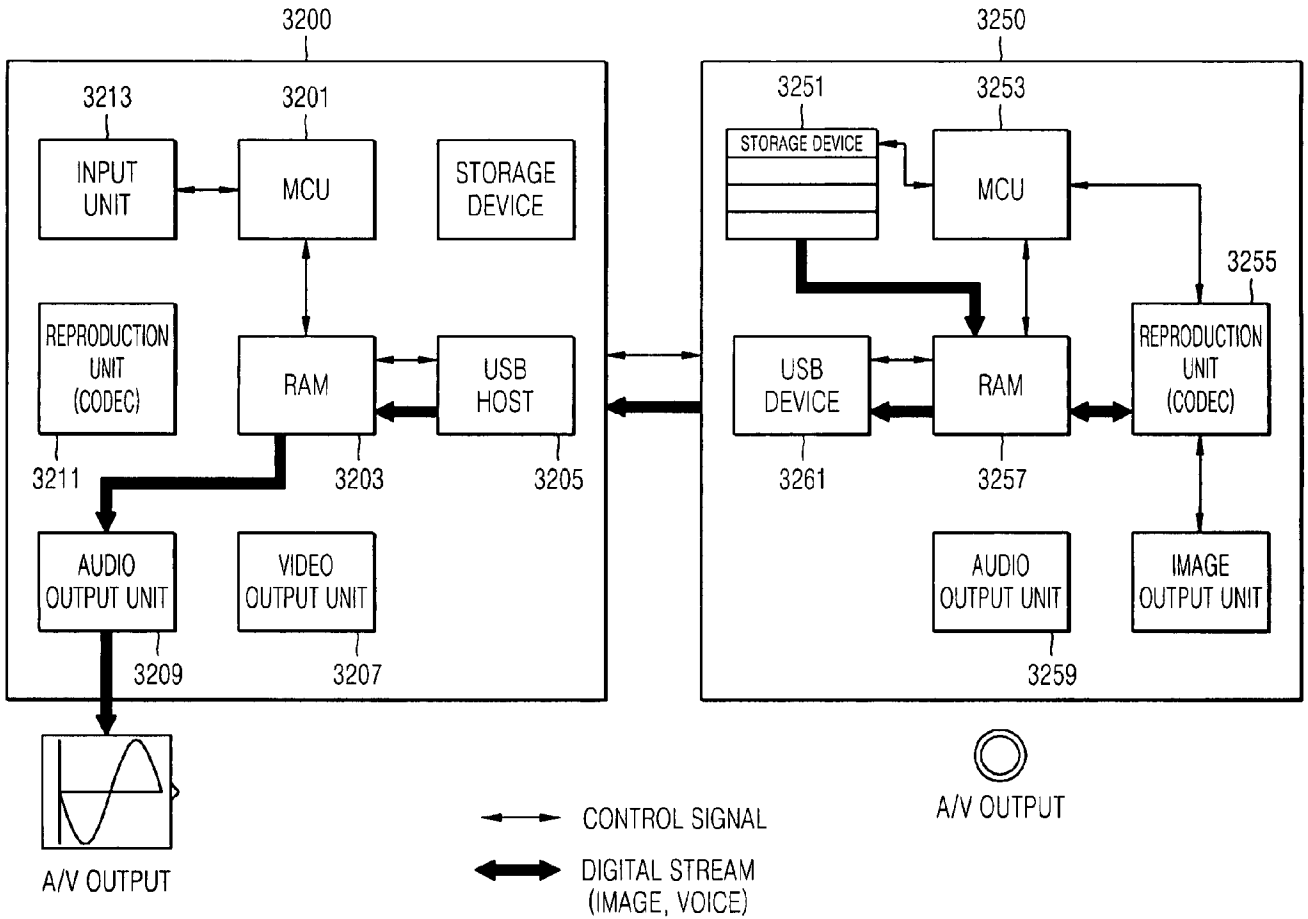
FIG. 32 is a diagram illustrating a structure of an MP3 reproducing apparatus connected to a USB host device and a path for reproducing a file according to an exemplary embodiment of the present invention.

FIG. 32 is a diagram illustrating a structure of an MP3 reproducing apparatus 3250 connected to a USB host device 3200 and a path for reproducing a file according to an exemplary embodiment of the present invention. A path for transferring a control signal is indicated by thin lines and a path for transferring a digital stream is indicated by thick lines.

Figure 33:
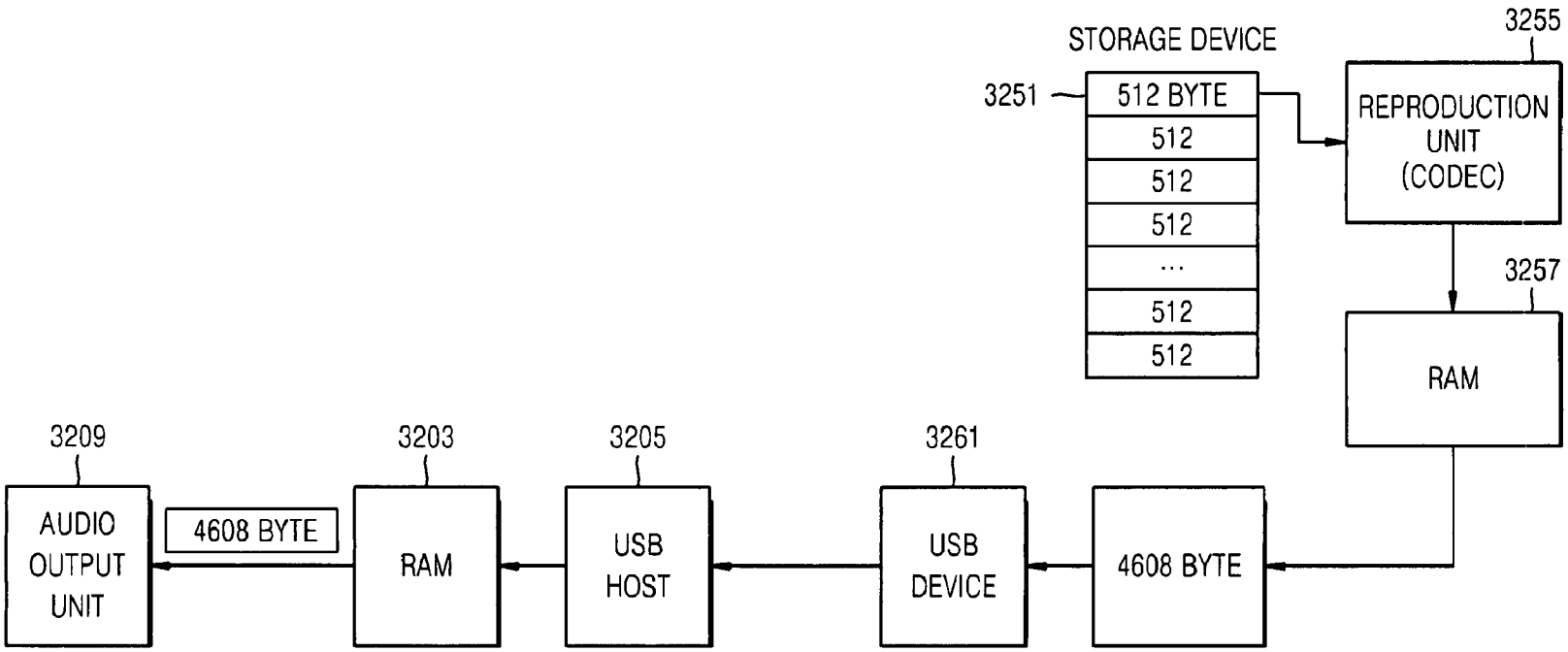
FIG. 33 is a diagram illustrating a path for transferring a voice signal reproduced from an MP3 file in the arrangement of FIG. 32 according to an exemplary embodiment of the present invention.

FIG. 33 is a diagram illustrating a path for transferring an MP3 file in the arrangement of FIG. 32 according to an exemplary embodiment of the present invention.

FIGS. 32 and 33 differ from the conventional technology illustrated in FIGS. 30 and 31. According to an exemplary embodiment of the present invention, data in the form in which reproduction of the data is completed by a reproduction unit 3255 of the MP3 reproducing apparatus 3250 is transmitted to a USB host device 3200 through USB interfaces 3261 and 3205. Accordingly, the transmitted data is output through a RAM 3203 and a audio output unit 3209, and does not pass through a codec 3211 of the USB host device 3200.

Figure 34:
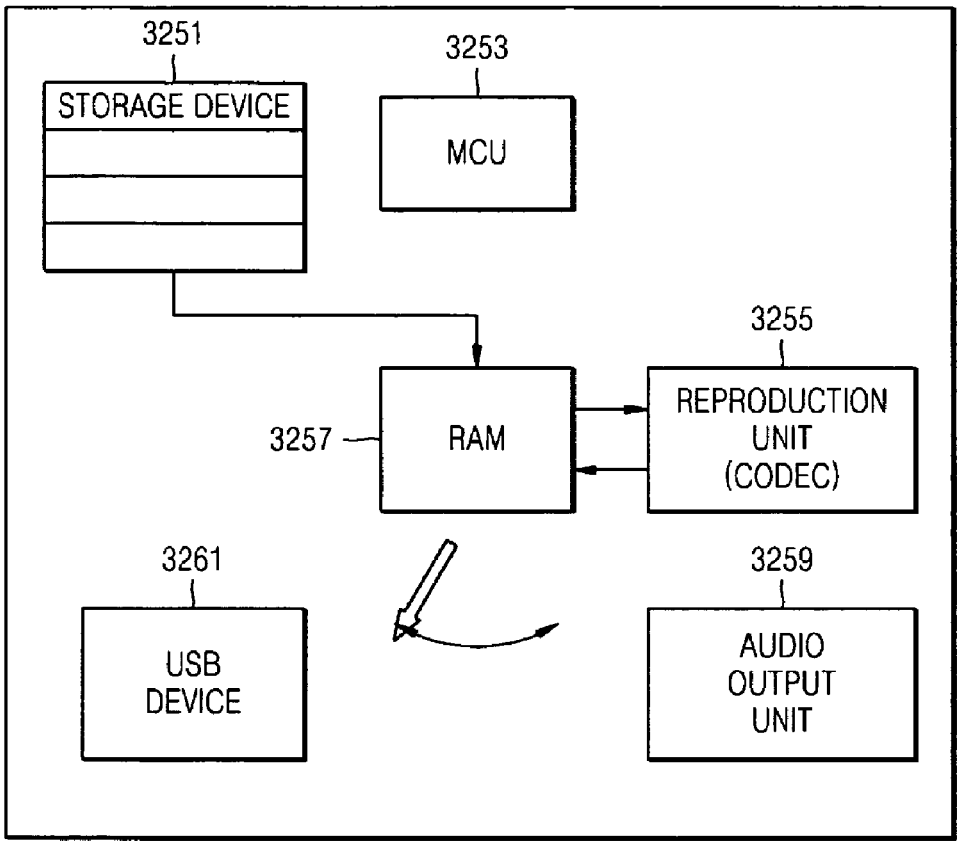
FIG. 34 is a diagram illustrating a switching principle for switching a data transfer direction according to an exemplary embodiment of the present invention.

FIG. 34 is a block diagram illustrating a switching principle for switching a data transfer direction according to an exemplary embodiment of the present invention.

Referring to FIG. 34, in the exemplary embodiment of the present invention, the direction of transmitting data is changed by internal switching based on software. That is, when data is output through a USB host device 3200 as illustrated in FIG. 32, reproduced data stored in a RAM 3257 is transferred to a USB device controller 3261, and when the MP3 reproducing apparatus 3250 itself outputs the data, switching is performed so that data can be transferred to an audio output unit 3259.

Figure 35:
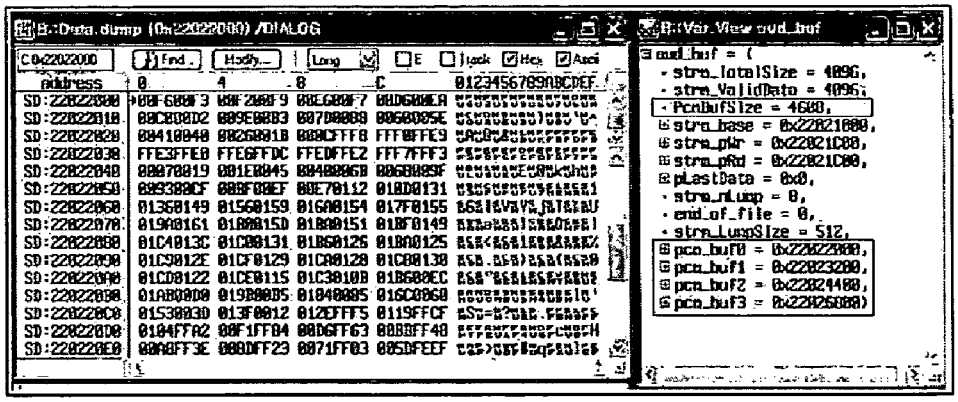
FIG. 35 is a view illustrating an example of data stored in a RAM in FIG. 33 according to an exemplary embodiment of the present invention.

FIG. 35 is a view illustrating an example of data stored in the RAM 3203 of FIG. 33 according to an exemplary embodiment of the present invention. Referring to FIG. 35, it can be seen that data of which reproduction is completed is transmitted unlike the conventional portable device.

Figure 36:
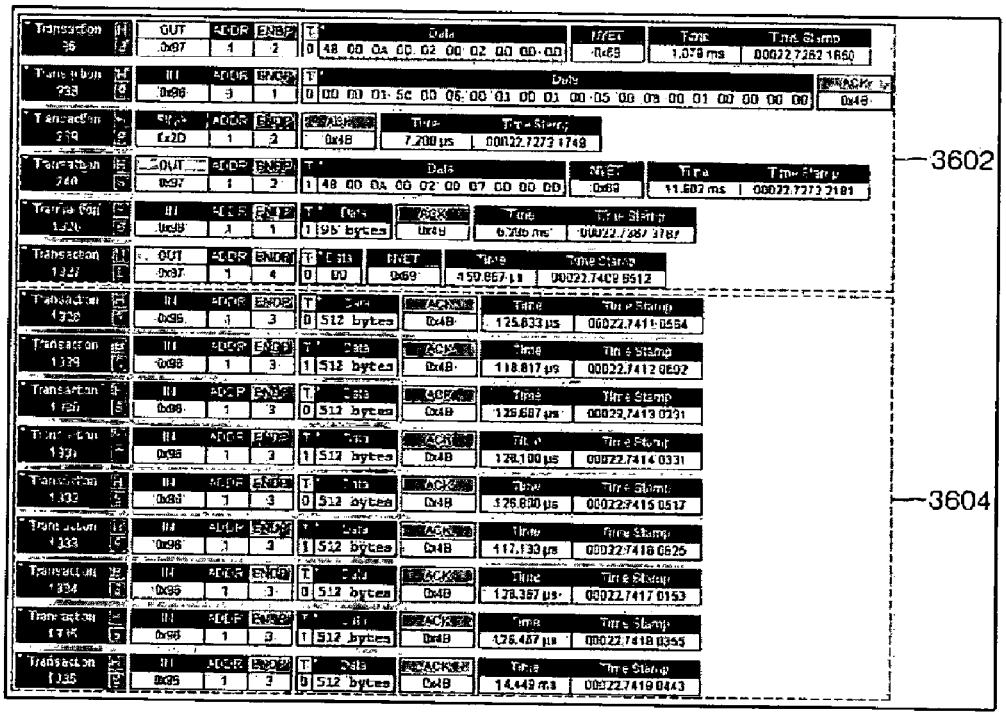
FIG. 36 is a view illustrating an example of analysis of data that is transmitted and received between devices when an interface method according to an exemplary embodiment of the present invention is implemented.

FIG. 36 is a view illustrating an example of data analysis that is transmitted and received between devices when an interface method according to an exemplary embodiment of the present invention is implemented. FIG. 36 illustrates the storage of data transmitted and received between devices through a USB cable in a USB signal analyzer.

Referring to FIG. 36, the top portion 3602 illustrates the transmission of a signal for controlling an MP3 reproducing apparatus. The top portion 3602 also illustrates that a resulting value is received, and the bottom portion 3604 illustrates that a reproduced audio signal is transmitted.

According to an exemplary embodiment of the present invention as described above, without separately manipulating an A/V system and a portable multimedia file recording and/or reproducing apparatus the portable device can be controlled and content files of the portable device can be reproduced through the A/V system by manipulating only the A/V system.

Also, according to an exemplary embodiment of the present invention, control and streaming of a portable device is facilitated without the addition of a separate device, or by adding only an interface box, and without changing a conventional A/V system. At this time, even when the A/V system is not equipped with a variety of codecs, reproduction through the A/V system is enabled such that a problem of code compatibility may be solved.

Furthermore, by using a user interface for operating an unaltered conventional CD changer, a portable device can be operated from an A/V system.

Also, in the case of digital content files protected by the DRM, by transmitting only the streaming and avoiding transmission of the file to the A/V system, utilization of an offline device, such as a car audio system, can be increased.

In addition, by using the USB interface, a large amount of reproduction information and a variety of A/V signals can be quickly transmitted, better compatibility with conventional portable devices can be provided, and power can be supplied to the portable device.

The present invention can also be embodied as computer readable code on a computer readable recording medium. The computer readable recording medium is any data storage device that can store data which can be thereafter read by a computer system. Examples of the computer readable recording medium include read-only memory (ROM), random-access memory (RAM), CD-ROMs, magnetic tapes, floppy disks, optical data storage devices, and carrier waves. The computer readable recording medium can also be distributed over network coupled computer systems so that the computer readable code is stored and executed in a distributed fashion.

While the present invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. An audio/video (A/V) system capable of controlling an external device as a source of audio and/or video output of the A/V system, said A/V system comprising:

an interface unit that transmits/receives control information to/from the external device and receives decoded digital multimedia data from the external device;

a digital-to-analog (D/A) conversion unit that converts the received decoded digital multimedia data into an analog audio and/or video signal; and a control unit that controls the interface unit and the D/A conversion unit such that the received decoded digital multimedia data is converted into the analog signal as audio and/or video output of the A/V system;

wherein the control information transmitted to the external device includes information on a multimedia file as requested from the A/V system and an operation command for controlling an operation on the requested multimedia file;

wherein the control information transmitted from the external device includes information on an operational state associated with the operation; and wherein the external device decodes the requested multimedia file in accordance with the operation command to generate the decoded digital multimedia data.

2. The system of claim 1, wherein the interface unit comprises a USB host controller.

3. The system of claim 2, wherein the control unit determines a time interval required for receiving a unit of decoded data from the external device and the number of units of decoded data that are required to be received by referring to information on the requested multimedia file and according to the determined time interval the control unit sequentially transmits a control signal requesting data, through the USB host controller, a number of times according to the number of units determined, and the USB host controller comprises a first bulk interface sequentially receiving data in predetermined reception units.

4. The system of claim 3, wherein the USB host controller further comprises a second bulk interface transmitting/receiving the control signal and control information on the multimedia file to/from the external device.

5. The system of claim 3, wherein through the first bulk interface, the USB host controller transmits/receives the control signal and control information on the multimedia file to/from the external device.

6. The system of claim 2, wherein the USB host controller comprises an isochronous interface receiving the decoded data.

7. The system of claim 6, wherein the USB host controller further comprises a bulk interface transmitting/receiving the control signal and control information comprising the result of executing the control signal to/from the external device.

8. The system of claim 6, wherein through the isochronous interface, the USB host controller transmits a digital stream to be stored in the external device.

9. An interface apparatus connected between an audio/video (A/V) system and a portable multimedia device for enabling the A/V system to control the portable multimedia device as a source of audio and/or video output of the A/V system, the interface apparatus comprising:

a first connection unit for connecting the portable multimedia device;

a second connection unit for connecting the A/V system;

an interface processing unit that transmits/receives control information to/from the portable device via the first connection unit, transmits/receives control information to/from the A/V system via the second connection unit, receives first decoded digital multimedia data from the portable device via the first connection unit, converts the first decoded digital multimedia data of a format outputted from the portable device into second multimedia data of a format complying with a protocol for connection to the A/V system, and transmitting the second multimedia data to the A/V system as audio and/video output of the A/V system via the second connection unit;

wherein the control information received from the A/V system includes information on a multimedia file as requested from the A/V system and an operation command for controlling an operation on the requested multimedia file;

wherein the control information received from the portable device includes information on an operational state associated with the operation; and wherein the portable device decodes the requested multimedia file in accordance with the operation command to generate the first decoded digital multimedia data.

10. The apparatus of claim 9, wherein the first connection unit comprises a USB connection unit.

11. The apparatus of claim 10, wherein the second connection unit comprises a first serial connection unit.

12. The apparatus of claim 11, wherein the interface processing unit comprises:

a USB host controller for controlling multimedia data communication with the portable multimedia device through the USB connection unit;

a serial controller for controlling multimedia data communication with the A/V system through the first serial connection unit;

a microcontroller for converting a control signal input from the serial controller into a USB command and outputting the USB command to the USB host controller, and converting reproduction multimedia information input from the USB host controller into multimedia data complying with a protocol for connection to the A/V system, and outputting the converted multimedia data to the serial controller; and a digital-to-analog (D/A) conversion unit for converting a digital multimedia data stream input through the USB host controller into analog multimedia data and outputting the analog multimedia data to the serial controller.

13. The apparatus of claim 12, further comprising:

a bypass unit directly connecting the first serial connection unit and a second serial connection unit; and an input unit receiving information on a device to be used, wherein if the device to be used comprises a CD changer, the microcontroller controls the bypass unit so that data communication between the A/V system and the CD changer is enabled.

14. The apparatus of claim 13, wherein the USB host controller comprises:

a bulk interface for transmitting and receiving the USB command and the reproduction information; and at least one of an isochronous interface and a bulk interface receiving the digital multimedia data stream.

15. An interface method between an audio/video (A/V) system and a portable device for enabling the A/V system to control the portable multimedia device as a source of audio and/or video output of the A/V system, the interface method comprising:

receiving a first control signal from the A/V system through a second connection unit;

converting the first control signal into a data format of a first connection unit and transmitting the converted first control signal to the portable device through the first connection unit;

receiving a digital multimedia data stream from the portable device through the first connection unit in response to the converted first control signal;

converting the received digital multimedia data stream into an analog signal;

transmitting the analog signal to the A/V system through the second connection unit;

wherein the interface method further comprising:

receiving a second control signal from the portable device through the first connection unit;

wherein the first control signal includes information on the multimedia file as requested from the A/V system and an operation command for controlling an operation on the requested multimedia file;

wherein the second control signal includes information on an operational state associated with the operation; and wherein the portable device decodes the requested multimedia file in accordance with the operation command to generate the digital multimedia data stream transmitted from the portable device.

16. A *non-transitory* computer readable medium having embodied thereon a computer program for executing an interface method between an audio/video (A/V) system and a portable device for enabling the A/V system to control the portable multimedia device as a source of audio and/or video output of the A/V system, the interface method comprising:

receiving a first control signal from the A/V system through a second connection unit;

converting the first control signal into a data format of a first connection unit and transmitting the converted first control signal to the portable device through the first connection unit;

receiving a digital stream from the portable device through the first connection unit in response to the converted control signal;

converting the received digital stream into an analog signal;

transmitting the analog signal to the A/V system through the second connection unit;

wherein the interface method further comprising:

receiving a second control signal from the portable device through the first connection unit;

wherein the first control signal includes information on the multimedia file as requested from the A/V system and an operation command for controlling an operation on the requested multimedia file;

wherein the second control signal includes information on an operational state associated with the operation; and wherein the portable device decodes the requested multimedia file in accordance with the operation command to generate the digital multimedia data stream transmitted from the portable device.

17. The apparatus of claim 12, further comprising a conversion unit connected to a front end of the first serial connection unit and converting a pin input of the A/V system to fit the pin arrangement of the first serial connection unit.

18. The method of claim 15, further comprising:

receiving an input of information on a device to be used through a third connection unit; and transferring the control signal received through the second connection unit to a CD changer through the third connection unit and cutting off a path for data communication with the portable device if the input information on the device to be used indicates the CD changer is to be used.

*19. A digital data recording and/or reproducing apparatus for receiving a control information from an A/V system comprising:*

*a storage unit to store digital data encoded in a predetermined format;*

*a decoder unit configured to decode the digital data stored in the storage unit;*

*a first controller configured to support an interface to communicate with an audio system having a second controller;*

*a digital/analog conversion unit configured to convert the decoded digital data into analog data;*

*an output unit configured to output the analog data;*

*a control unit configured to:*

*receive control information from the audio system through the first controller,*

*cause the decoder to decode the stored digital data corresponding to the received control information,*

*transfer the decoded digital data corresponding to the received control information to the audio system, and*

*switch into one of a transmission state transmitting the decoded digital data to the audio system through the first controller and an output state converting the decoded data into the analog data by the digital/analog conversion unit and outputting the converted analog data by the output unit.*

*20. The apparatus of claim 19, wherein the control unit controls the decoder unit to decode the digital data in predetermined units according to a control signal from the audio system, and*

*the first controller comprises a first bulk interface sequentially transmitting the data decoded in predetermined units.*

*21. The apparatus of claim 20, wherein the first controller further comprises a second bulk interface transmitting/receiving the control signal and control information comprising information on the digital data to/from the audio system.*

*22. The apparatus of claim 20, wherein, through the first bulk interface, the first controller receives a control signal from the audio system and transmits information on digital data requested by the audio system.*

*23. The apparatus of claim 19, wherein the first controller comprises an isochronous interface for transmission of the decoded data in response to a control signal from the audio system.*

*24. The apparatus of claim 23, wherein the first controller further comprises a bulk interface transmitting/receiving the control signal and control information comprising the result of executing the control signal to/from the audio system.*

*25. The apparatus of claim 23, wherein the first controller receives a digital stream from the audio system through the isochronous interface, and the control unit encodes the received digital stream and stores the encoded digital stream in the storage unit.*

*26. The apparatus of claim 19, wherein if the digital data comprises encrypted data, the control unit decrypts the encrypted data and then transmits the decrypted data to the audio system.*

*27. The apparatus of claim 26, wherein the control unit transmits the decoded data to the audio system by using an encryption method.*

*28. The apparatus of claim 19, further comprising an input unit receiving an input of a device using method,*

*wherein if a command to use a conventional USB protocol is input through the input unit, the control unit controls the first controller so that the digital data recording and reproducing apparatus operates according to the conventional USB protocol.*

*29. The apparatus of claim 19, wherein the first controller comprises a USB device controller and the second controller comprises a USB host controller.*

*30. A method of reproducing, through an audio system, a digital data stored in a digital data recording and/or reproducing apparatus for receiving a control information from the audio system, the method comprising:*

*receiving a control information from the audio system through the first controller;*

*decoding the stored digital data corresponding to the received control information; and*

*switching into one of a transmission state transmitting the decoded digital data to the audio system through the first controller, and an output state wherein the second mode is the mode in which the decoded digital data is*

*converting the decoded data into the analog data and outputting the converted analog data; and*

*in the transmission state, transferring the decoded digital data corresponding to the received control information to the audio system having a second controller.*

*31. The method of claim 30, wherein the decoding of the digital data comprises sequentially decoding the digital data in predetermined units according to the reproduction command, and*

*the transmitting of the decoded data comprises sequentially transmitting the decoded data in predetermined units through a first bulk interface comprised in the first controller according to the reproduction command.*

*32. The method of claim 31, wherein the receiving of the control signal comprises receiving the control signal through at least one of the first bulk interface and a second bulk interface included in the first controller.*

*33. The method of claim 32, further comprising transmitting information on the digital data, used to determine a number of predetermined units required for transmitting the decoded data and a time interval of the transmitting, to the audio system through at least one of the first bulk interface and the second bulk interface.*

*34. The method of claim 30, wherein the transmitting of the decoded data comprises transmitting the decoded data through an isochronous interface included in the first controller.*

*35. The method of claim 34, wherein the receiving of the control signal comprises receiving the control signal through a bulk interface included in the first controller, and*

*the method further comprises transmitting a result of executing the control signal through the bulk interface.*

*36. The method of claim 30, wherein the decoding of the digital data further comprises decrypting the file if the digital data comprises an encrypted file.*

*37. The method of claim 36, wherein the transmitting of the decoded data further comprises encrypting the decoded data.*

*38. The method of claim 30, further comprising:*

*receiving an input on a device using method; and*

*controlling the first controller so that the digital data recording and reproducing apparatus operate as a portable device if a command to use the apparatus as a portable device is input.*

*39. The method of claim 30, wherein the first controller comprises a USB device controller and the second controller comprises a USB host controller.*

* * * * *